(12) United States Patent
Inoue et al.

(10) Patent No.: US 7,353,195 B2
(45) Date of Patent: Apr. 1, 2008

(54) SYSTEM FOR PURCHASE MANAGEMENT AND FOR FACILITATING DISTRIBUTION

(75) Inventors: Makoto Inoue, Kanagawa (JP); Kimio Ariga, Saitama (JP); Tsuguharu Nishizaki, Kanagawa (JP); Nobuhiko Hasegawa, Chiba (JP); Katsumi Ueno, Kanagawa (JP); Junji Ushironaka, Hyogo (JP); Youichi Matsuura, Kyoto (JP); Masamichi Kine, Nara (JP); Jun Benki, Hyogo (JP); Masaru Sashiki, Tokyo (JP)

(73) Assignee: Kokuyo Co., Ltd., Osaka-Shi, Osaka (JP)

( * ) Notice: Subject to any disclaimer, the term of this patent is extended or adjusted under 35 U.S.C. 154(b) by 526 days.

(21) Appl. No.: 09/987,194

(22) Filed: Nov. 13, 2001

(65) Prior Publication Data

US 2002/0059122 A1    May 16, 2002

(30) Foreign Application Priority Data

Nov. 13, 2000    (JP) ............................. 2000-344735

(51) Int. Cl.
*G06Q 10/00* (2006.01)
(52) U.S. Cl. .......................................... 705/30; 705/27
(58) Field of Classification Search .................. 705/26, 705/27, 28, 29, 30
See application file for complete search history.

(56) References Cited

U.S. PATENT DOCUMENTS

| | | | | |
|---|---|---|---|---|
| 5,319,542 A | * | 6/1994 | King et al. | 705/27 |
| 5,758,327 A | * | 5/1998 | Gardner et al. | 705/26 |
| 5,799,289 A | * | 8/1998 | Fukushima et al. | 705/400 |
| 5,870,717 A | * | 2/1999 | Wiecha | 705/26 |
| 6,910,018 B1 | * | 6/2005 | Okada et al. | 705/26 |

FOREIGN PATENT DOCUMENTS

| | | |
|---|---|---|
| JP | 06-348729 | 12/1994 |
| JP | 07-028912 | 1/1995 |
| JP | 08-050582 | 2/1996 |
| JP | 09-097284 | 4/1997 |
| JP | 10-261026 | 9/1998 |
| JP | 2000-029963 | 1/2000 |
| JP | 2000-076342 | 3/2000 |
| JP | 2000-132596 | 5/2000 |

OTHER PUBLICATIONS

Notification of Reasons for Refusal dated Jul. 26, 2006 with a partial English translation.

* cited by examiner

*Primary Examiner*—Gerald J. O'Connor
(74) *Attorney, Agent, or Firm*—McGinn IP Law Group, PLLC

(57) ABSTRACT

The present invention provides a purchase management system which comprises an AS specific dividing controller 19 for performing control of dividing the purchase request per administrative standard when the AS specifying unit determines that the administrative standards of the respective items to which the purchase request was made differ; an administration controller 21 for receiving the purchase request divided per administrative standard and administratively controlling the purchase request; a divided ordering controller 22 for performing control of dividing and ordering the purchase request per item specific dealer when the administration controller allows the purchase request; and an order totaling controller 23 for totaling the order data ordered by the divided ordering controller according to the attribute of the expense item of the order.

9 Claims, 14 Drawing Sheets

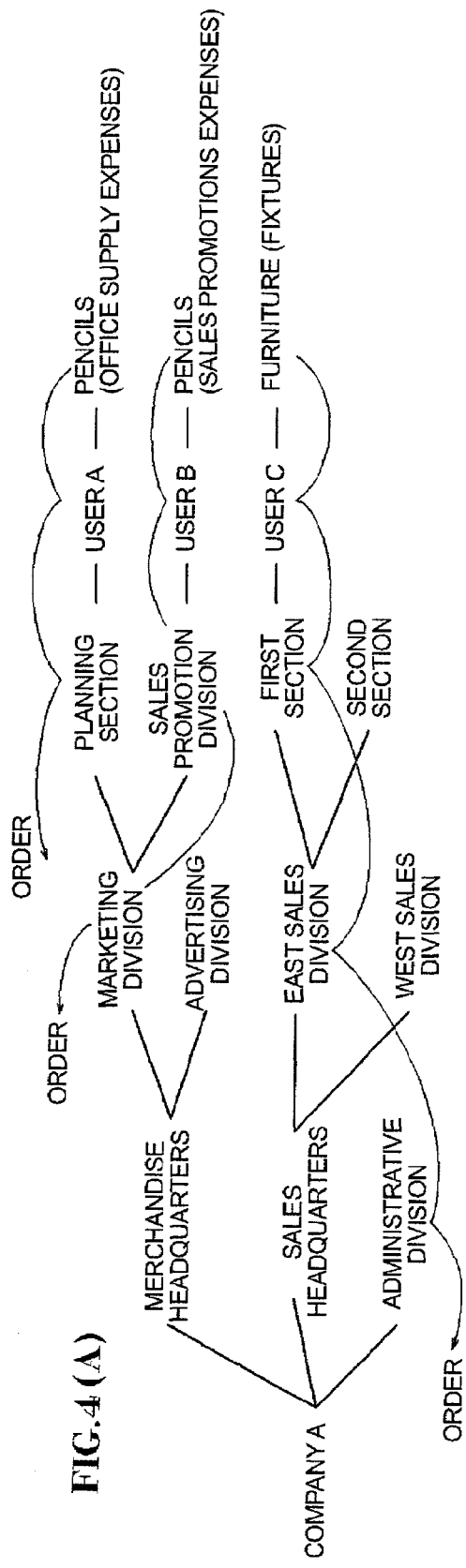

FIG.5

| EXPENSE ITEM | BUDGET CONTROL UNIT | PURCHASE RECORD | BUDGET PERFORMANCE | BUDGET |
|---|---|---|---|---|
| FURNITURE | ADMINISTRATIVE DIVISION | 10 | 310 | 800 |
| | SALES HEADQUARTERS | 100 | | |
| | EAST SALES DIVISION | 70 | | |
| | FIRST SECTION | 20 | | |
| | SECOND SECTION | 50 | | |
| | WEST SALES DIVISION | 30 | | |
| | MERCHANDISE HQ | 200 | | |
| | ADVERTISING DIVISION | 180 | | |
| | MARKETING DIVISION | 20 | | |
| | PLANNING SECTION | 15 | | |
| | SALES PROMOTION DIV. | 5 | | |
| OFFICE SUPPLIES | ADMINISTRATIVE DIVISION | 10 | 10 | 100 |
| | EAST SALES DIVISION | 20 | 20 | 30 |
| | FIRST SECTION | 15 | | |
| | SECOND SECTION | 5 | | |
| | WEST SALES DIVISION | 13 | 13 | 20 |
| | MERCHANDISE HQ | 300 | 300 | 400 |
| | ADVERTISING DIVISION | 100 | | |
| | MARKETING DIVISION | 200 | | |
| | PLANNING SECTION | 150 | | |
| | SALES PROMOTION DIV. | 50 | | |

FIG.6

USER (52)

USER ID

MANAGEMENT UNIT ID
USER NAME
DIRECT DELIVERY DESTINATION ID
BILLING DESTINATION ID
BUDGET CONTROL UNIT ID
PASSWORD
ORDERING PROHIBITED ITEM ORDERING AUTHORIZATION FLAG
USER HOLIDAY FLAG

PURCHASE MANAGEMENT MASTER (16)

BUDGET CONTROL UNIT ID
EXPENSE ITEM CODE

APPROVAL/BUDGET CONTROL FLAG
APPROVAL METHOD CATEGORY
FIRST LAYER BUDGET CONTROL UNIT ID
SECOND LAYER BUDGET CONTROL UNIT ID
FINAL LAYER BUDGET CONTROL UNIT ID
RESPECTIVE MINIMUM PRICE INFORMATION
RESPECTIVE APPROVER INFORMATION

MERCHANDISE MASTER (3)

ITEM NUMBER

ITEM NAME
PRICE
FIRST EXPENSE ITEM
SECOND EXPENSE ITEM
⋮
ITEM EXPLANATORY INFORMATION

EXPENSE ITEM RELATED MASTER (17)

BUDGET CONTROL UNIT ID
ITEM GROUP ID

FIRST EXPENSE ITEM
SECOND EXPENSE ITEM
⋮
EXPENSE ITEM EXPLANATORY INFORMATION

FIG.11

3 — MERCHANDISE

ITEM NUMBER

SOURCE MAKER CODE
SUPPLIER ID
DELIVERER JUDGMENT FLAG
SPECIAL ITEM NUMBER CATEGORY
OTHER SITE AFFILIATION CATEGORY
INTRODUCTION IMAGE FILE NAME
MAKER SUGGESTED RETAIL PRICE
SCHEDULE DATE OF PRICE REVISION
ITEM CATEGORY
KEYWORDS FOR SEARCHING
OUT OF SALES RELATED INFORMATION

4B — MD UNIT

MD UNIT ID

SERVICE FORM ID
MD UNIT NAME
MAINTENANCE RESPONSIBILITY MANAGEMENT UNIT ID
CUSTOMER MANAGEMENT UNIT ID
PRICE RELATED INFORMATION DISPLAY ENABLE/DISABLE FLAG
ITEM REPLACING METHOD
MD DECREASE FLAG

4A — MERCHANDISE ASSORTMENT (MD)

MERCHANDISE ASSORTMENT ID
ITEM NUMBER

PRICE DETERMINATION CATEGORY
PRICE
PRICE FACTOR
DEALER PURCHASE PRICE
SUPPLIER MANAGEMENT UNIT ID
DELIVERER MANAGEMENT UNIT ID
REPLACEMENT ITEM NUMBER
REPLACING STATUS
REPLACEMENT DATE
OUT OF SALES PROCESSING DATE
EXPENSE ITEM CODE
GENERAL USER ORDERING PROHIBITION CATEGORY
OFFERING PRICE ROUNDING CATEGORY

FIG.12

EXPENSE ITEM MASTER ~54

MANAGEMENT UNIT ID
EXPENSE ITEM CODE

EXPENSE ITEM CODE NAME
SELECTABLE FLAG UPON ORDERING
EXPENSE CODE EXPLANATION

APPROVAL PATH AND BUDGET LAYER MASTER ~55

MANAGEMENT UNIT ID
BUDGET CONTROL UNIT ID
EXPENSE CODE

APPROVAL/BUDGET CONTROL FLAG
APPROVAL METHOD CATEGORY
FIRST LAYER BUDGET CONTROL UNIT ID
SECOND LAYER BUDGET CONTROL UNIT ID
FINAL LAYER BUDGET CONTROL UNIT ID
RESPECTIVE MINIMUM PRICE INFORMATION
RESPECTIVE APPROVER INFORMATION

BUDGET CONTROL UNIT MASTER ~56

MANAGEMENT UNIT ID
BUDGET CONTROL UNIT ID

APPROVER USER ID
EXPENSE ITEM CODE
BUDGET CONTROL CODE
BUDGET CONTROL NAME

BUDGET/APPROVAL TOTALING MANAGEMENT MASTER ~57

MANAGEMENT UNIT ID
BUDGET CONTROL UNIT ID
EXPENSE ITEM CODE

PURCHASE TOTAL FOR APPROVAL BUDGET

SYSTEM FOR PURCHASE MANAGEMENT AND FOR FACILITATING DISTRIBUTION

BACKGROUND OF THE INVENTION

1. Field of the Invention

The present invention generally relates to a purchase management system, and particularly to a purchase management system for administering the likes of budget control and approval management in relation to the purchase of items.

2. Description of the Related Art

Organizations such as companies consume various MRO (Maintenance, Repair and Operations), furniture and so forth in immense quantities. These office supplies are necessary for the business operation of the organization, and the purchase thereof is managed in relation to the budget and accounting of the organization. Office supplies, fixtures, furniture and the like are indirectly necessary for business activities and production activities, and are sometimes referred to as non-productions or sub-materials.

The purchase of non-productions is made in small amounts, high frequency, large varieties and immense quantities, and the sellers, i.e., dealers, and the purchase conditions often vary depending on the item or territory. Thus, purchase management in organizations is complicated. Large-scale organizations with several hundred employees negotiate with the dealer on the item list subject to purchase and the prices thereof for purchases to be made within a fixed period of time. Generally, the person in charge of the purchase division of the company negotiates with the dealer. Organizations such as companies seek to lighten the workload of purchase management by conducting purchase activities within a fixed period of time in accordance with such negotiation results.

Conventionally, large-scale organizations with several hundred employees would set forth the line of business and prices between dealers, such as shops, and the customers (organizations such as companies) pursuant to the negotiation with estimates conducted within a fixed period of time and conduct purchase activities according to such arrangement in order to seek the simplification of purchase management. In recent years, various methods have been proposed for realizing further labor saving by conducting the likes of purchase management and order processing with computers.

Japanese Laid Open Patent Publication No. H9-97284 (1997) discloses a method of totaling the order price of the respective ordering divisions based on the order information of office supplies and the like, and outputting order authorization information when such totaled order price does not exceed the budget limit of the ordering divisions stored in advance. This publication discloses a function of evenly distributing the orders to a plurality of dealers (shops).

Japanese Laid Open Patent Publication No. 2000-76342 discloses a method of inputting, after having selected a plurality of items, information on the source to bear such expenses, workplace code, accounting title, expense item, facility budget code, desired delivery date and supplier regarding the purchase of such plurality of types of articles. Further disclosed is that the relationship of the accounting title, expense item, expense bearing source code and facility budget code uses a predetermined crosscheck table (FIG. 21).

Moreover, Japanese Laid Open Patent Publication No. H7-28912 (1995) discloses a method of hierarchically defining divisions for conducting budget control with respect to purchasing. Japanese Laid Open Patent Publication No. H6-348729 (1994) discloses a method of specifying the channel of approval according to the type of invoice.

With each of the conventional examples described above, labor saving is realized for individual work according to individual functions. However, in order to conduct purchase activities dependent on accounting of the organization or purchase conditions for each purchase, each user has to master the purchase conditions such as by referring to various manuals and inquiring to the purchase management division and so on. In such a case, even when introducing a purchase management system or the like, there is an inconvenience in that the daily business burden of the purchase management department will, to no small extent, remain. In other words, with the aforementioned conventional examples or the combinations thereof, it is difficult to structure an ideal situation where a user requiring the item is able to place orders only as needed according to purchase conditions and the budget of the organization. For instance, with the conventional example where the user himself/herself inputs the accounting title and expense item regarding the item to be ordered, such user must remember which item belongs to which accounting title and expense item (e.g., sales promotion, office supplies, business trip), or check it out at the time of requesting (ordering) the purchase. Moreover, after selecting a plurality of items and it becomes evident that they are not of the same accounting title, it is necessary to reselect the items from the beginning.

As described above, with the aforementioned conventional examples or the combinations of elemental technology thereof, it is not possible for a user belonging to an organization to personally request orders (purchase request) or place orders with ease, without having to be aware of the purchase conditions and so on of the organization.

Furthermore, it is possible to seek reduction of personnel costs (business costs, transaction costs, or employment costs) relating to approvals or accounting by standardizing internal purchase conditions and purchase methods with respect to management of purchase activities such as budget control, purchase and approval of items, and accounting management concerning the purchase of items. However, since the purchase of non-productions is made in high frequency, large varieties and immense quantities, in addition to items being improved or discontinued frequently, system development and maintenance costs as well as employment costs necessary for operation become enormous in order to conduct purchase management including such budget control and administrative accounting. As a result, there may be cases where costs would increase pursuant to the purchase management of non-productions.

With respect to the purchase activities and management of non-productions and sub-materials, since these are indirect affairs in relation to business activities and production activities, it is desirable that they be conducted at low costs. Unfortunately, with the aforementioned conventional examples, enormous personnel expenses are required inside the organization.

Since companies are required to prepare documents necessary for the payment of various taxes and documents necessary for financial reports, purchase of non-productions and accounting procedures thereof are essential activities for the companies. The fact that purchase management of non-productions is an essential activity is making the reduction of "invisible costs" relating to the purchase of non-productions even more difficult. That is to say, it is not possible to abolish in anyway the purchase of non-productions and accounting procedures thereof. Thus, it is necessary to consider the possibilities of reducing costs relating to the purchase of non-productions.

Meanwhile, with the management in recent years, there is a strong demand for implementing financial accounting and administrative accounting from a variety of directionalities; for example, from the concretization of cost-sharing per small divisions to the calculation in units spreading across a plurality of companies, such as by accounting per business division, internal company system, spinouts, outsource of divisions only accruing costs, or contrarily, implementation of consolidated accounting for affiliated companies altogether. In order to enable implementation of administrative accounting in detailed units, it is necessary to make the unit of orders smaller. On the other hand, if the unit of orders is too small, for example, the number of approval procedures will increase, thereby making the overall purchase activity itself overly complicated.

SUMMARY OF THE INVENTION

An object of the present invention is to improve the inconveniences in the foregoing conventional examples, and particularly to provide a purchase management system enabling a user to conduct the purchase of non-productions, with ease, without such user having to master the purchase conditions and the like within the organization.

Another object of the present invention is to provide a purchase management system capable of analyzing and totaling the purchase activity performance of a wide variety of items from various directions, with a minimal workload of the purchase management division and users.

The present invention is constituted by comprising: an AS specifying unit for specifying, when a purchase request is to be made on a plurality of types of items, the administrative standard of the purchase request according to the expense item representing the category or use of the items defined for each item each time an item is selected; an AS specific dividing controller for performing control of dividing the purchase request per administrative standard when the AS specifying unit specifies that the administrative standards of the respective items to which the purchase request was made differ; an administration controller for receiving the purchase request divided per administrative standard and administratively controlling the purchase request; a divided ordering controller for performing control of dividing and ordering the purchase request per item specific dealer when the administration controller allows the purchase request; and an order totaling controller for totaling the order data ordered by the divided ordering controller according to the attribute of the expense item of the order. The present invention thereby aims to attain the objects described above.

When a user belonging to an organization makes a purchase request, the present invention performs purchase management processing on the likes of order availability and approval in relation to the budget limit according to such purchase request, and transmits the purchase request, in which the management processing has been completed, to the seller (shops, etc.) as order data. The AS specifying unit specifies the administrative standard (AS) of purchasing on the likes of the approval path or budget limit according to the expense item of the item each time an item is selected as a purchase request. An expense item is, for example, an accounting title of financial accounting. Moreover, the expense items may also be a simplified subject code or a subclass of the accounting title in order to assist in the understanding of the user within the organization.

The AS specific dividing controller performs control of dividing the purchase request per administrative standard when the AS specifying unit specifies that the administrative standards of the respective items to which the purchase request was made differ. Thus, the user is able to make a purchase request for a variety of item groups, collectively, exceeding the administrative standard frame of the approval path and the like. The administrative standard being identical implies that, for example, the approval paths are identical, the budget limits are identical, or cases where the point of non-approval coincides. Next, the administration controller receives the purchase request divided per administrative standard and administratively controls the purchase request. When the approval and the like according to the control of this administration controller is completed, the divided ordering controller performs the control of dividing the purchase request in item specific dealers and places orders to the respective dealers. This order may be printed on a purchase order or order data may be transmitted online to the respective shops. With the present invention, upon making a purchase request, the user of the customer may issue a purchase request without having to know beforehand the details of the administrative standard (e.g., approval path) of such item. Moreover, this may be handled as a single purchase request regardless of the administrative standard, classification of dealers and items, or the expense item. Pursuant to the system of the present invention, a collective purchase request is divided per administrative standard and approval and budget control are conducted thereby. Further, the system of the present invention automatically divides and orders the approved purchase processing request to one or a plurality of dealers for each item. Therefore, the user is not required to know beforehand the administrative standard or dealer.

In addition, with the present invention, the order totaling controller totals the order data ordered by the divided ordering controller according to the attribute of the expense item of the order. As order attributes, in addition to the expense item, the business division to which the user, i.e., orderer, belongs, affiliated project, dealer, order date and time, order frequency and the like correspond thereto. The order totaling controller totals the purchase record according to the purpose such as administrative accounting, regardless of the purchase request unit or unit per dealer. Thereby, the user as the orderer is not required to acquire special knowledge on purchase management, and may place orders enabling analysis with detailed administrative accounting in accordance with the purchase management standard predetermined by the purchase management division or the like.

According to the present invention that is structured and which functions as described above, the AS specific dividing controller performs the control of dividing the purchase request per administrative standard when the administrative standards of the respective items to which purchase request was made differ among such items. Thus, the user is able to make a purchase request for a variety of item groups, collectively, exceeding the administrative standard frame of approval path and the like. This means that the number of approvals can be minimized. Moreover, the divided ordering controller divides the collectively handled purchase requests in a purchase administrative standard unit in item specific dealers and places orders to the respective dealers. Thus, upon making a purchase request, the user may issue a purchase request without having to know beforehand the details of the administrative standard (e.g., approval path) of such item or the dealer per respective item. Further, the order totaling controller totals the purchase record according to order attributes such as the expense item, the business division to which the user, i.e., orderer, belongs, affiliated project, dealer, order date and time, order frequency, and so on. Therefore, purchase results may be totaled according to the purpose such as administrative accounting regardless of the purchase request unit or unit per dealer. As described above, by employing the system according to the present invention, the user as the orderer is not required to acquire special knowledge on purchase management, and, without the purchase management division having to bear an enormous workload, may place orders enabling analysis with detailed administrative accounting in accordance with the purchase management standard predetermined by the purchase management division or the like.

BRIEF DESCRIPTION OF THE DRAWINGS

FIG. 2(A) is a diagram showing the relationship with the affiliated division, FIG. 2(B) is a diagram showing the relationship with the budget control unit, and FIG. 2(C) is a diagram showing the relationship with the item group;

FIG. 3(A) is a diagram showing the relationship between the user and the expense item, FIG. 3(5) is a diagram showing an example of the perusal control using the item group, FIG. 3(C) is a diagram showing an example of perusal control using the expense item, and FIG. 3(D) is a diagram showing an example of an AS specific division of the purchase request;

FIGS. 4(A)-4(B) are explanatory diagrams showing an example of the purchase standard in the present embodiment, and snecifically FIG. 4(A) is a diagram showing the layer of the divisions, and FIG. 4(B) is a diagram showing an example of layered definitions on the budget control in the division layer illustrated in FIG. 4(A);

FIG. 5 is an explanatory diagram showing the counting example of the purchase record in the present embodiment;

FIG. 6 is an explanatory diagram showing an example of the principle articles of the various masters in the present embodiment;

FIG. 11 is an explanatory diagram showing the structure of the merchandise master and the like in the present example;

FIG. 12 is an explanatory diagram showing the structure of the various masters relating to the purchase management in the present example;

DESCRIPTION OF THE PREFERRED EMBODIMENTS

<First Embodiment: Purchase Management System>

Figure 1:
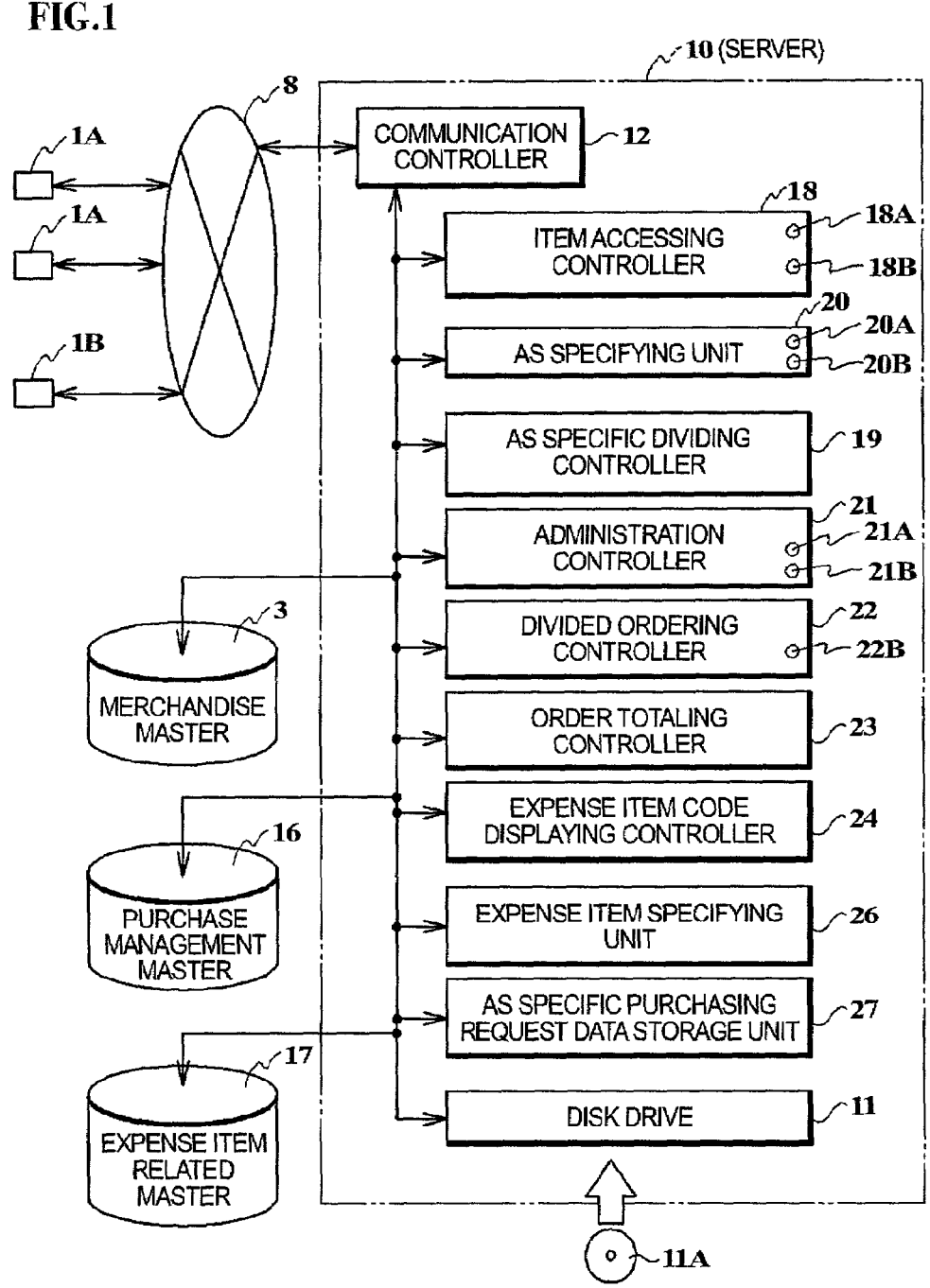
FIG. 1 is a block diagram showing the structural example of the purchase management system according to the first embodiment of the present invention.

The first embodiment of the present invention is now explained with reference to the drawings. FIG. 1 is a block diagram showing the structure of the first embodiment of this invention. The purchase management system according to the present embodiment manages the purchase based on the administrative standard set at forth by the likes of a purchase management division of the customer. An administrative standard (AS) is the definition of an expense item regarding the item, budget control determined pursuant to the combination of the item, expense item and user's division, purchase approval path, or the like.

This system comprises an AS specifying unit 20 for specifying, when a purchase request is to be made on a plurality of types of items from the user terminal 1A, the administrative standard of the purchase request according to the expense item representing the category or use of the items defined for each item each time an item is selected. This system further comprises an AS specific dividing controller 19 for performing control of dividing the purchase request per administrative standard when the AS specifying unit 20 specifies that the administrative standards of the respective items to which the purchase request was made differ; and an administration controller 21 for receiving the purchase request divided per administrative standard by the AS specific dividing controller 19 and administratively controlling the purchase request. This system further comprises a divided ordering controller 22 for performing control of dividing and ordering the purchase request per item specific dealer when the administration controller 21 allows the purchase request; and an order totaling controller 23 for totaling the order data ordered by the divided ordering controller 22 according to the attribute of the expense item of the order.

Moreover, in the example illustrated in FIG. 1, the AS specifying unit 20 comprises a user specific AS specifying function 20A. This function 20A specifies the administrative standard according to the budget control to which the user belongs and the expense item. This function 20A is able to define the usable expense item based on the budget control unit (affiliation with purchase management) of the user in accordance with whether it is a manufacturing division or a division using sales promotions expenses. The AS specifying unit 20 further comprises a path specifying function 20B. This function 20B specifies as the administrative standard the budget control unit ID for identifying one or a plurality of budget controlling divisions, or the budget control unit ID for identifying a plurality of budget/approval controlling divisions. This function specifies a plurality of budget control unit IDs corresponding to a plurality of divisions according to the approval path and budget control layer.

In purchase management, there are cases where only the budget control is performed and cases where budget control with approval is performed. The path specifying function 20B, in the case of only performing budget control, specifies as the administrative standard the budget control unit ID which specifies one or a plurality of budget control divisions. Moreover, in the case of performing budget control with approval, this function specifies as the administrative standard the budget control unit ID which specifies a plurality of budget/approval management divisions for managing the budget and approval. The budge control unit ID generally specifies names of divisions in an organization. By specifying the budget control unit ID in layers, approval path and the like can be specified.

In the present embodiment, the AS specific dividing controller 19 performs control of dividing the purchase request per administrative standard when the AS specifying unit specifies that the administrative standards of the respective items to which the purchase request was made differ. Thus, the user is able to make a purchase request for a variety of item groups, collectively, exceeding the administrative standard frame of the approval path and the like. Further, the divided ordering controller 22 performs control of automatically dividing and ordering the purchase request divided per administrative standard to the respective dealers. Thus, the user is able to place an order (purchase request) of a necessary item with a single operation without having to know beforehand the administrative standards such as the approval path and budget limit management division, or internal purchase conditions such as the dealer.

An "expense item" is a concept of dividing the item into groups such as the account title in accounting or item category to be used in budget control for conducting purchase management. Generally, when an item is specified, the expense item is also exclusively specified. However, for example, when purchasing stationeries to be used at an exhibition with an objective of sales promotion, the expense item will be considered as expenses for sales promotion andnot office supplies. Further, with respect to furniture, under accounting rules, even if it is the same item, such item will be considered as expenses for office supplies if within a certain amount, for fixtures if more than a certain amount, and for tools, equipment and fixtures (fixed assets) depending on the life period and purchase price. The expense item of items uses as tools among stationeries may differ depending on whether the purchasing division is a manufacturing division or not. In the present embodiment, the budget control unit to which the user belongs and an expense item usable with the item group are set forth. And, when receiving a selection of the item with the purchase request, this usable expense item is displayed to the user, and selection thereof is induced.

Figure 2:
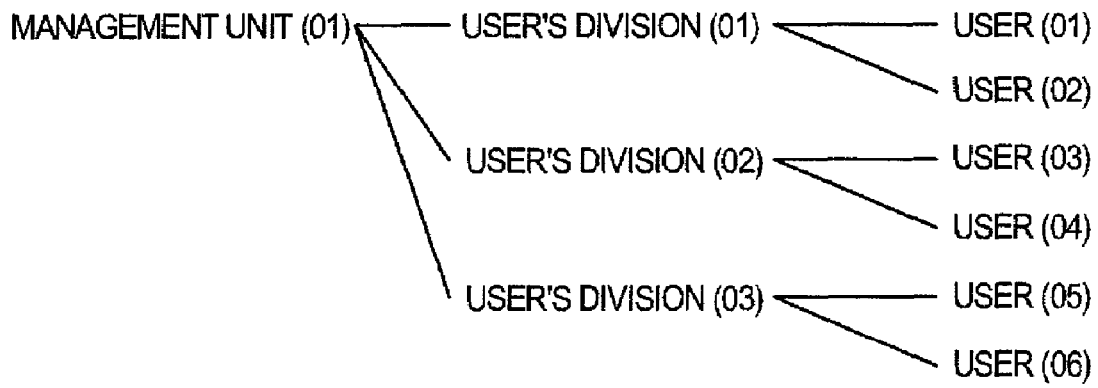
FIGS. 2(A)-2(C) are explanatory diagrams showing the relationship between the affiliation and expense item of the user in the present embodiment, and specifically
Figure 2:
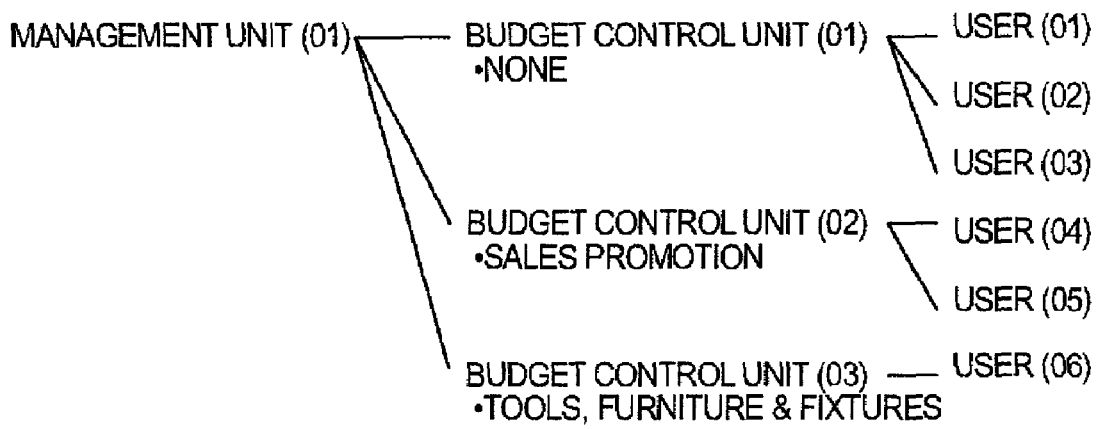
Figure 2:
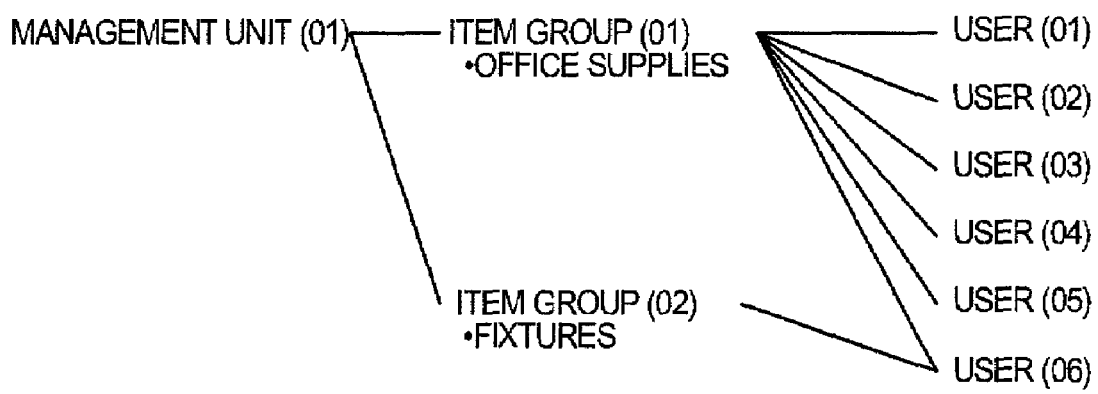

FIG. 2 is an explanatory diagram showing the relationship of users and expense items. As shown in FIG. 2(A), a user has a primary affiliated division. Meanwhile, the budget limit may be set forth subject to the traverse range in divisions for each project. There are additional cases where the budget limit will differ in accordance with the difference in the manufacturing division, administrative division, and so on. When the budget limit in the organization (management unit of a company, etc.) is not set genuinely by divisions, but rather is set per project or territory, the budget control unit will differ from the layer of the affiliated division. In the example shown in FIG. 2(B), for the sake of description, the user's division and budget control unit are of differing groups. The user (04) of the affiliated division (02) shall be assumed to be the person in charge of sales promotion.

In the example shown in FIG. 2(B), usable expense items are defined for each budget control unit. In the example shown in FIG. 2(C), usable expense items are defined for each item group. In the present embodiment, the expense item usable when this budget control is specified and the expense item usable when the item group is specified are used in combination. In a preferable example, the initially set expense item is displayed when an item is specified by a user, and, when a separate expense item is defined in the budget control unit to which the user belongs or in the selected item, such expense item is also made to be selectable.

Figure 3:
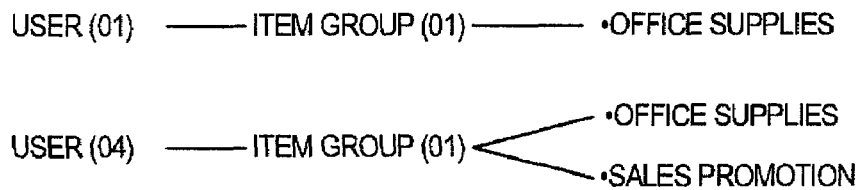
FIGS. 3(A)-3(D) are explanatory diagrams showing the relationship between the item group and expense item of the user, and specifically
Figure 3:
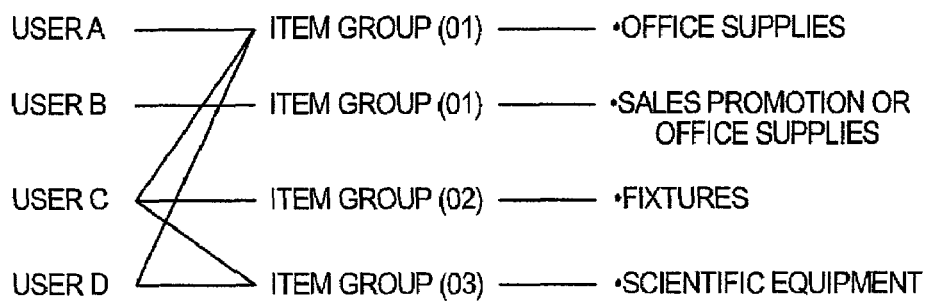
Figure 3:
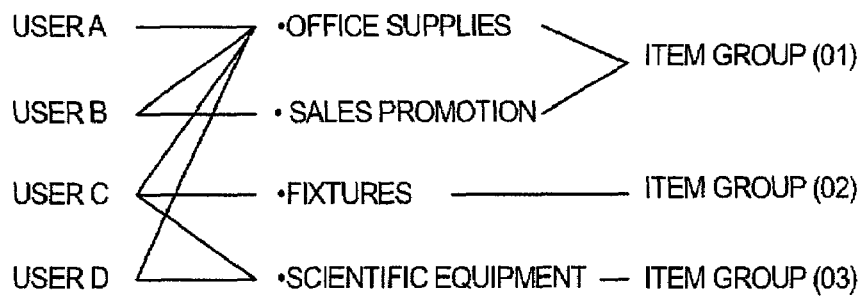
Figure 3:
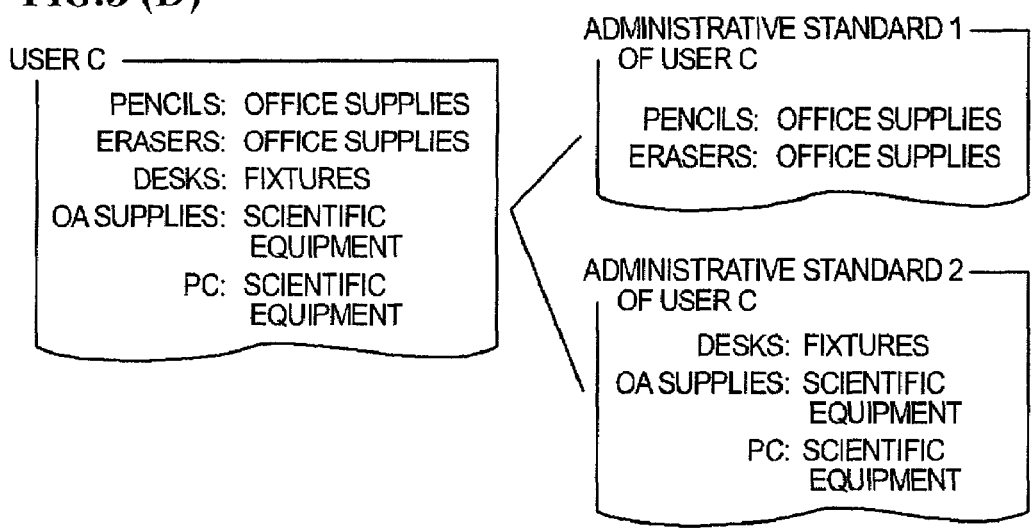

The item group (01) shall include stationeryoffice supplies such as filing supplies, pencils, and so on. As shown in FIG. 3(A), ordinary users such as user (01) purchase the above as office supply expenses. Here, the expense item defined in item group (01) shown in FIG. 2(C) is used. Meanwhile, user (04), who is the person in charge of sales promotion, may purchase the above with an expense item code as sales promotion expenses (promotion cost), which are expenses relating to exhibits in showrooms, and not as office supplies to be consumed within the organization. This promotion cost is the expense item code defined in budget control unit (02) shown in FIG. 2(B). As described above, the user may creatively use a plurality of types of expense item codes relating to the same item by employing the expense item code set forth to the budget control unit, which is a user group, and the expense item code set forth to the item. Further, by defining the expense item code pursuant to the item contents to the item group, and defining the expense item code pursuant to the use to the budget control unit, a principle expense item and an exceptional expense item may be creatively used for the respective users.

Referring back to FIG. 1, the purchase management system according to the present embodiment item accessing controller 18 for specifying the item group purchasable by the user for each user making a purchase request of an item, and performing the control of per using the item per user according to the availability of such purchase. The item accessing controller 18 controls the orderable item per user. For example, as shown in FIG. 3(B), users A, B can only order from item group (01), user C is able to order items from all item groups (01), (02), (03), and user D can order from item group (01) and item group (02). When user A makes a purchase request, the item accessing controller 18 performs control of not displaying item group (02) and the like on the item selection screen, or adding a selection of purchase request only for perusal.

In the example shown in FIG. 3(B), the item accessing controller 18 comprises a function 18A for determining the purchase availability per user based on the MD related information which specifies the merchandise assortment (MD) set forth per respective user or user group. In other words, this function 18A pre-defines the relationship of the user and item group. The expense item code is defined in the budget control unit of the item or user. Thereby, the item access control and the expense item code specified by the user's usage are realized. In the example shown in FIG. 3(B), user A can only purchase item group (01) as office supply expenses, and, meanwhile, user B may purchase item group (01) as promotion costs or office supply expenses. Pursuant to the function of item accessing controller 18, users A and B are not able to access item groups (02), (03). That is, even if user A logs in, item groups (02), (03) are not displayed.

In the example shown in FIG. 3(C), the item accessing controller 18 comprises a function 18B for determining the purchase availability for each user based on the purchasable expense item predetermined per respective user or user group. In the example shown in FIG. 3(C), the user is connected with the expense item code. Every user is able to make the purchase as office supply expenses, but only user C is able to make the purchase as fixtures expenses. As the expense item code is also a category of the item, in the example shown in FIG. 3(C), an item group is defined in the respective expense item codes. Thereby, the item accessing controller 18 controls the purchasable items per respective user. Here, user B is able to access item group (01) as promotion costs. The expense item per user is realized by associating this expense item code and item group.

In the example shown in FIG. 1, the AS specifying unit 20 specifies the purchase administrative standard of an item according to the expense item of such item each time a user's designation of an item in a purchase request is received. The AS specifying unit 20 may also specify the administrative standard based on the name of the affiliated division of the user and the expense item. An "administrative standard", for example, is a budget limit or approver. When conducting approvals and budget control in layers, the approval path and budget control layers become the administrative standard. This administrative standard may be specified after a user selects an item and before such item is temporarily accumulated in the likes of an electronic shopping cart.

The AS specifying unit 20 determines, each time an item is accumulated in the shopping cart, whether it is the identical administrative standard with the other items already accumulated in the shopping cart. When the administrative standard is identical, the purchase requests accumulated in the shopping cart are collectively input as is in the approval processing or budget control processing. Meanwhile, when the item groups accumulated in the shopping cart belong to a plurality of administrative standards, the AS specific dividing controller 19 divides the item groups to which the purchase request per administrative standard.

For instance, as shown in FIG. 3(D), a freshman is assigned to a certain division, and offices supplies such as pencils, a desk, personal computer (PC), and computer related office supplies are purchased for such freshman. Since user C is able to purchase all items of office supply expenses, fixtures expenses, and scientific equipment, as shown in FIG. 3(D), the purchase request is made simultaneously and collectively for all necessary items regardless of the administrative standard or shop. Then, let it be assumed that the office supply expenses belong to administrative standard 1, and fixture expenses and scientific equipment belong to the identical administrative standard 2. The AS specific dividing controller 19, as shown in FIG. 3(D), divides the plurality of item groups to which the purchase request was made per administrative standard.

In the purchase requests divided per administrative standard, administrative processing such as budget execution and approval is performed for the respective administration standards in accordance with the control of the administration controller 21. When the administrative processing is completed, the divided ordering controller 22 divides the purchase request per dealer and places orders. For example, when ordering a desk and PC to different dealers, the divided ordering controller 22 further divides the purchase request of administrative standard 2 and places orders to the respective shops.

As described above, in the present embodiment, the person making the purchase request is able to make the purchase request only on orderable items without having to know beforehand the item which he/she may order, and purchase requests for necessary articles may be made collectively regardless of the shop or administrative standard. Meanwhile, since the approving side makes the approval on purchase requests which are divided with the administrative standard as the largest frame, there is no need to separately each and every item, and approval can be made collectively. Further, since orders are made by being automatically divided per shop, it is possible to place an order based on the purchase agreement or the like set forth per shop, without having to refer to the person in charge of purchasing. Moreover, since a purchase request is made collectively regardless of the administrative standard or dealer, the inspection procedures of whether the items to which the purchase request was made have been delivered in full are facilitated.

In the present embodiment, as a result of dividing the purchase request by using the administrative standard frame, a plurality of types of items can be collectively approved or the budget thereof may be executed, and in comparison to separately administering the approval or the like for each item, the workload for number of approvals required for the purchase management can be reduced. While improving the convenience of users and purchase management divisions as described above, actual orders are placed by dividing the orders per dealer. Thus, for example, it is possible to collectively perform approval processing for stationery and books, and successively place orders by automatically dividing the order data to a stationery store and bookstore. By making the administrative standard such as approval path and budget limit a purchase request unit, collectively performing administrative processing of purchases even when there are different types of items will reduce the number of times (frequency) of complicated approval processing and the like. Further, purchase management such as approvals and the size/scope of the actual order are handled differently pursuant to the automatic division processing of order data per dealer. Thereby, in an aspect of purchase management, a comparatively large variety of items is collectively handled in order to reduce the number of approvals and the like. Meanwhile, order to be placed to dealers can be handled as separate orders for each seller.

The AS specifying unit 20 specifies the administrative standard with the expense item of the item. In order to specify the administrative standard with this expense item, foremost, the expense item corresponding to the item is specified. In the example shown in FIG. 1, the server 10 comprises an expense item code displaying controller 24 for selectively displaying, at the time of the purchase request, the expense item code defined in the budget control unit to which the user making the purchase request of items belongs, and the expense item code set forth per category of the items or per price decision method of the items; and an expense item specifying unit 26 for inputting, among one or a plurality of expense item codes displayed selectively by this expense item code displaying controller 24, the expense item code specified when the user makes the purchase request as the expense item of the item as the AS specifying unit 20.

As elements for specifying the expense item, set forth may be the item, user's division, budget control unit to which the user belongs (whether it is a manufacturing site such as a factory, etc.), usage of item (for sales promotion or advertisement, etc.), and so on. For instance, when purchasing stationery for sales promotion, it is not possible to specify in advance whether the expense item of such item belongs to sales promotion expenses or office supply expenses.

The expense item code displaying controller 24 selectively displays, at the time of purchase request, the product category of the item or the expense item code set forth per price determining category. Since the price determining category is sometimes used for classifying goods within the purchase management system, this price determining category and the expense item may be made to correspond. For example, when a purchase management system is to provide an item administered by another system, the price in this system is calculated from the price in the other system. In the collaboration with the other system, a price determining category code for determining the price of the item is used. In such a case, by associating this price determining category code with the expense item, an expense item may be defined in the respective items even when it is not possible to provide an expense item to the respective items in advance.

Here, when the user makes a purchase request, the expense item code displaying controller 24 performs the control of notifying such user of the expense item for each item or per budget control unit (e.g., affiliated division, affiliated project) to which the user belongs. The expense item code displaying controller 24, for example, may display the expense items in a pop-up menu format. Then, at the time of purchase request, the selects an expense item in such purchase request from one or a plurality of expense items display controlled by the expense item code displaying controller 24. At the time of purchase request, the expense item specifying unit 26 inputs to the AS specifying unit 20, as the expense item of such item, the expense item code selected by the user at the time of purchase request among one or a plurality of expense item codes selectively displayed by the expense item code displaying controller 24. When the expense item is specified, the purchase administrative standard such as the budget limit and approval path is specified by employing the budget control unit to which the user belongs and the expense item. Even when the expense item of books is miscellaneous expenses and the expense item of stationery is office supply expenses, there may be cases where the administrative standards are identical. Therefore, even when the expense items are different, if the administrative standards are the same, a collective purchase request is possible. The reason for not specifying the administrative standard directly from the item or the like and specifying the expense item once is because this expense item will become necessary in the financial accounting of purchase records.

FIG. 4 is an explanatory diagram showing an example of a purchase administrative standard. The divisions of a certain company A (management unit) are in three layers. And, as shown in FIG. 4(B), the budget layer is set forth separately per expense item. For example, the planning section of the marketing division will purchase office supplies within the budget limit of the marketing division and purchase fixtures within the budget limit of the administrative division. When user A of the planning section is to purchase pencils under office supply expenses (for internal consumption), the order is generally placed with the approval from within such planning section. The budget limit is, as shown in FIG. 4(B), of the marketing division. When user B of the sales promotion section is to purchase pencils under sales promotions expenses, since the purchase amount of promotion costs becomes large, the approval of the next higher layer (marketing division in this case) is usually required. Moreover, it may also be that orders may be placed without requiring approval if within a fixed amount, and orders may require approval when exceeding a fixed amount.

When user C of the first section is to purchase furniture under fixture expenses, the order is placed upon obtaining the approval of the first section, East sales division, and administrative division. Fixture expenses and the like are often under the control of the administrative division, and not the respective divisions. As shown in FIG. 4(B), there are cases where the administrative division is made to be the budget limit management division, and the purchase is placed under the budget of the sales headquarters which does not provide the approval. When obtaining approval in layers as described above, the setting may be such that number of layers of approval required for the purchase is determined based on the expense item and the maximum purchase amount set forth per such expense item.

FIG. 5 is an explanatory diagram showing a totaling example of purchase records by the order totaling controller 23. In the example shown in FIG. 5, the purchase record is calculated per expense item and budget control unit. The expense item of furniture is included in the facility expenses. Stationery office supplies are included in the office supply expenses. As shown in FIG. 5, purchase record 20 of the first section, for example, is included in the purchase record 70 of the East sales division. The purchase record of this East sales division is included in the sales headquarters 100. FIG. 5 shows an example of totaling the purchase record of furniture (fixture expenses) of all divisions in the administrative division.

FIG. 6 is an explanatory diagram showing article examples of the purchase management master and the like illustrated in FIG. 1. A user ID is provided to the user. Each user ID has a management unit ID for identifying the company or the division of the company to which the user belongs, a user name, a direct delivery destination ID which will become the destination upon placing the order, billing destination ID for identifying the name of the division and so forth of the billing destination, a budget control unit ID for identifying the budget control unit to which the user belongs, a password necessary for logging into the system, and so on. In the example shown in FIG. 6, the merchandise master has an item number for identifying an item from other items, the item name, and the price thereof. And, one or a plurality of expense items usable in such item are defined. Providing a plurality of expense items to an item is preferable, for example, when using expense item codes in layers. For instance, when using expense item layers of books, furniture, fixtures and so on, it is preferable that a plurality of expense items be defined to an item.

Furthermore, in the example shown in FIG. 6, defined in the expense item related master 17 are expense items specified by using a budget control unit ID, and an item group ID for identifying item groups (product category, price determining method of goods, etc.). In this example, when handling a vast variety of items, the items are divided into groups, and, by using the item group and budget control unit, one or a plurality of expense items usable in the item contained in the item group by the user belonging to such budget control unit are defined. By defining the expense item with the item group and budget control unit, for example, even in cases where it is not possible to provide an expense item code to all items in advance with respect to items that are not directly controlled with the purchase management system of the present embodiment, it is possible to define the expense item code. Thus, for instance, purchase with expense item codes is possible even in cases of purchasing or selling items in collaboration with other systems. Then, when purchasing all non-productions with the purchase management system according to the present embodiment, it is possible to provide a systematic expense item code in advance to all purchased items.

These expense items are set forth in accordance with the designation of the person in charge of the purchase management and the accountant upon introducing this system. The person in charge of purchase management is no longer required to conduct the operation of specifying expense items in the aspect of actual purchase to be made thereafter by defining data relating to the expense item in the database shown in FIG. 6 per item or per budget control unit.

The purchase management master sets forth the purchase administrative standard as shown in FIG. 4(B) by using the budget control unit ID and expense item code. The approval/budget control flag is a flag for identifying, per budget control unit, whether to only perform budget control or to perform both the approval and budget control. By employing this flag, processing is possible where, for example, approval is not provided with respect to stationery and books, and approval is provided with respect to furniture and scientific equipment (computers and the like). As the approval method, for example, there is a lower limit method, total accumulation method, and lower limit & total accumulation method. The lower limit method is a method of setting forth a purchase amount (upper limit) settleable only in the respective layers when approval paths are set forth in layers. The total accumulation method is a method of requiring the approval of the approver of the budget limit administrative division when, for example, a budget limit has been set forth, and a purchase request is made in which the accumulative purchase record will exceed the budget limit. The lower limit & total accumulation method is a method of ordinarily performing the lower limit method, and performing the total accumulation method when exceeding the budget frame.

As shown in FIG. 6, the purchase management master has a first layer budget control unit ID, a second layers budget control unit ID, and a final layer budget control unit ID (budget limit administrative division ID). When deploying each of these budget control units, the structure will be of that shown in FIG. 4(B), for example. And, lower limit information, information for identifying the approver, cumulative amount (purchase record) information and so on are stored per budget control unit.

Figure 7:
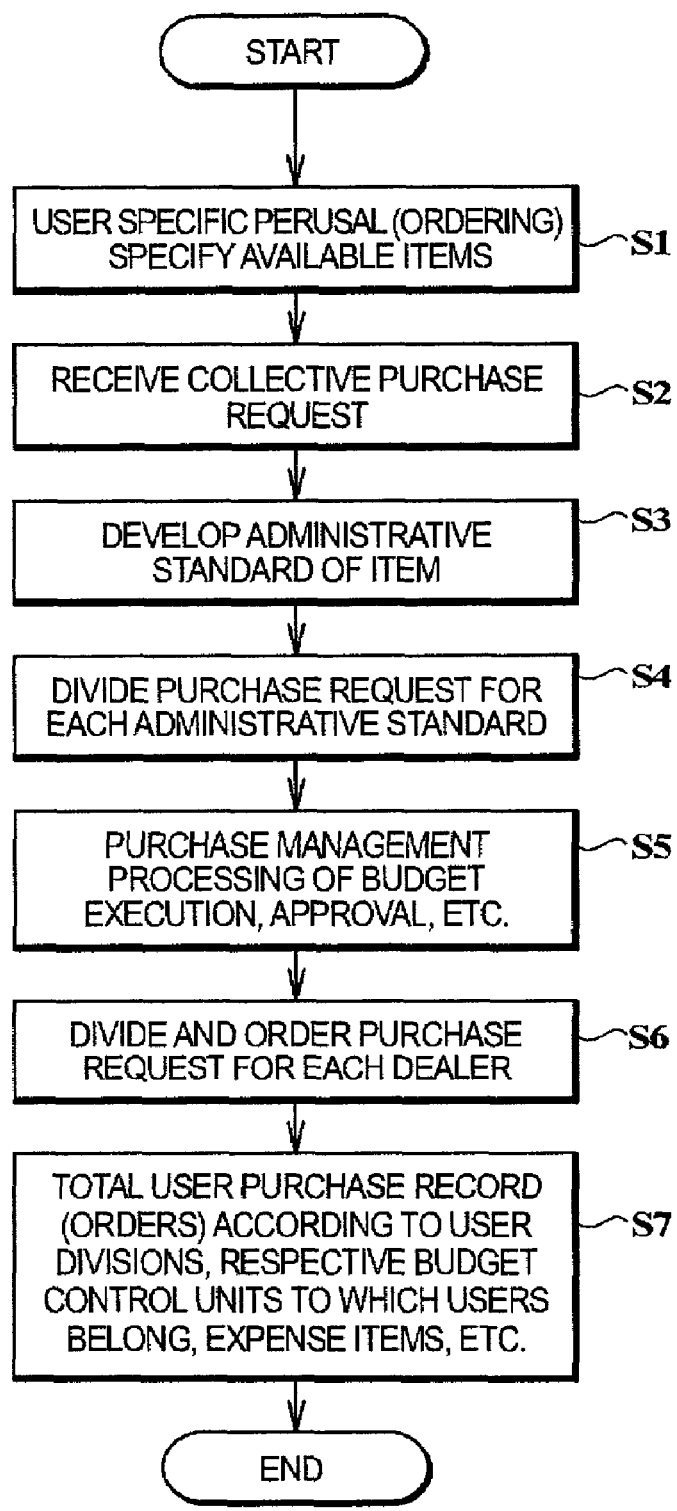
FIG. 7 is a flowchart showing an example of the purchase management processing in the present embodiment.

FIG. 7 is a flowchart showing an example of the purchase management processing in the present embodiment. The user logs into the purchase management system using a password. Then, the user ID and budget control ID are set forth. When the user ID is set forth, foremost, perusable (orderable) items per user are specified (step S1, item perusal control step). Next, among the items purchasable by such user, a collective purchase request is received for all items required by the user (step S2). When the purchase request is received, the administrative standard (e.g., approval path and budget limit) of the respective items is deployed (step S3, administrative standard specifying step).

When the respective items of the purchase request received in step S2 belongs to a plurality of administrative standards, the respective items are divided per administrative standard (step S4, administrative standard dividing step). Then, the purchase management processing of the respective purchase requests divided per administrative standard is controlled (step S5, administrative controlling step).

When the purchase management processing is completed and the order is allowed, control for dividing and ordering the purchase requests per item specific dealer is performed (step S6, divided ordering controlling step). With respect to the specification of dealers, for example, an exclusive dealer (shop) may be specified for the respective items, or, a dealer may be selected based on certain conditions when there are a plurality of dealers for the same item. As the mode of ordering, the order may simply be printed on a purchase order, or order data may be transmitted online via a network. It is preferable that the order data and articles in the purchase order include particulars on the delivery and invoice by referring to the user master 52 or the like shown in FIG. 6.

After such orders have been placed, purchase records are totaled according to the user's division, respective budget control units, expense items, and so on (step S8, order totaling processing step).

The structure shown in FIG. 1 and the processing shown in FIG. 6 may be realized by employing a program for purchase management which will activate the CPU of the server 10. This purchase management program comprises each of the following codes as codes for activating the server 10.

An AS specifying code for specifying the administrative standard of the purchase request in accordance with the expense item representing the category or use of the item defined in the purchase managers, each time an item is selected, when a purchase request for a plurality of types of items is made.

An AS specific dividing code for dividing the purchase request per administrative standard when it is determined that the administrative standards of the respective items to which the purchase request was made are different.

An administrative controlling code for receiving the purchase request divided per the administrative standard and administratively controlling the purchase request.

A divided ordering controlling code for performing control of dividing and ordering the purchase request per item specific dealer when the purchase request is allowed.

An order totaling controlling code for totaling the divided and ordered order data according to the attributes of the expense item of the order.

Here, when the AS specifying code and the like "activate" the server 10, included is one or both of the code for activating the CPU of the server 10 with only the respective codes, and the code for activating the computer dependent on an operating system stored beforehand in the operation device or on another program such as a database driving program. For instance, in the example shown in FIG. 1, the AS specifying code maybe made to be dependent on a database search function pursuant to a database driving program stored beforehand in the server 10, such that is becomes a code for delivering the search items of the budget control unit or expense item codes and the like to the purchase management master 16 to such search function.

As described above, in a recording medium that stores the purchase management program and program for the distribution support system, and which is a recording medium used for delivering such programs to users, for example, there are cases where only the "code for delivering the master name and article name to the database server" is stored. This is determined by the relationship between the operating system of the computer to be activated and the server program or the like.

The purchase management program is supplied to the computer by being stored in a portable recording medium 12. In the example shown in FIG. 1, the disk drive 11 drives the recording medium 12 such as a CD-ROM, and stores the purchase management program stored in the recording medium 12 in an executable state in the likes of a hard disk under the control of the server 10. Moreover, this may also be directly transferred to a hard disk or the like of the server via a network.

<Application of First Embodiment>

Next, application of the present embodiment is explained with reference to FIG. 1 and FIG. 8. In this application, the purchase management system comprises a function of receiving a purchase request in a range where the administrative standards are identical, and inducing the user to make different purchase requests when the administrative standards differ. The purchase management system in this application comprises an AS specifying unit 20 for specifying, when a purchase request is to be made on a plurality of types of items, the administrative standard of the purchase request according to the expense item representing the category or use of the items defined for each item each time an item is selected. Further, this system comprises an administration controller 21 for receiving a collective purchase of a plurality of types of items when the administrative standards specified by this AS specifying unit 20 are identical, and administratively controlling the purchase request; a divided ordering controller 22; and an order totaling controller 23. The divided ordering controller 22 and order totaling controller 23 are the same as those described in the aforementioned embodiment.

The AS specifying unit 20 comprises a user specific AS specifying function 20A for specifying the administrative standard according to the budget control unit to which the user belongs and the expense item, and a path specifying function 203 for specifying as the administrative standard the budget control unit ID for identifying one or a plurality of budget controlling divisions, or the budget control unit ID for identifying a plurality of budget/approval controlling divisions.

Particularly, in this application, the administration controller 21 comprises a path specific execution function 21A for executing, when the layers of the budget control unit ID specified by the path specifying function 20B are identical, budget processing or budget/approval processing with such budget control unit ID by lumping together the plurality of types of items; and a path specific division dependency controlling function 21B for inducing the user to divide the purchase request for purchase request of items having different layers of budget control unit ID. For example, when the item to which expense item 1 is fixed and the item to which expense item 2 is fixed have the same approval path, the path specific execution function 21A executes administrative processing on the purchase by lumping such items together. Administrative processing of the purchase is, for example, the determination of purchase availability in comparison to the budget, or the approval dependency and the like to the approver terminal 1B. Meanwhile, the path specific division dependency controlling function 21B induces the user to divide the purchase request for purchase requests of items having different layers of budget control unit ID. That is, the permissible range of making a purchase request by lumping together a plurality of types of items is within the scope of identical approval paths, and the path specific division dependency controlling function 21B prompts, when an item having a different approval path is selected, the generation of a separate purchase processing request for such item.

Figure 8:
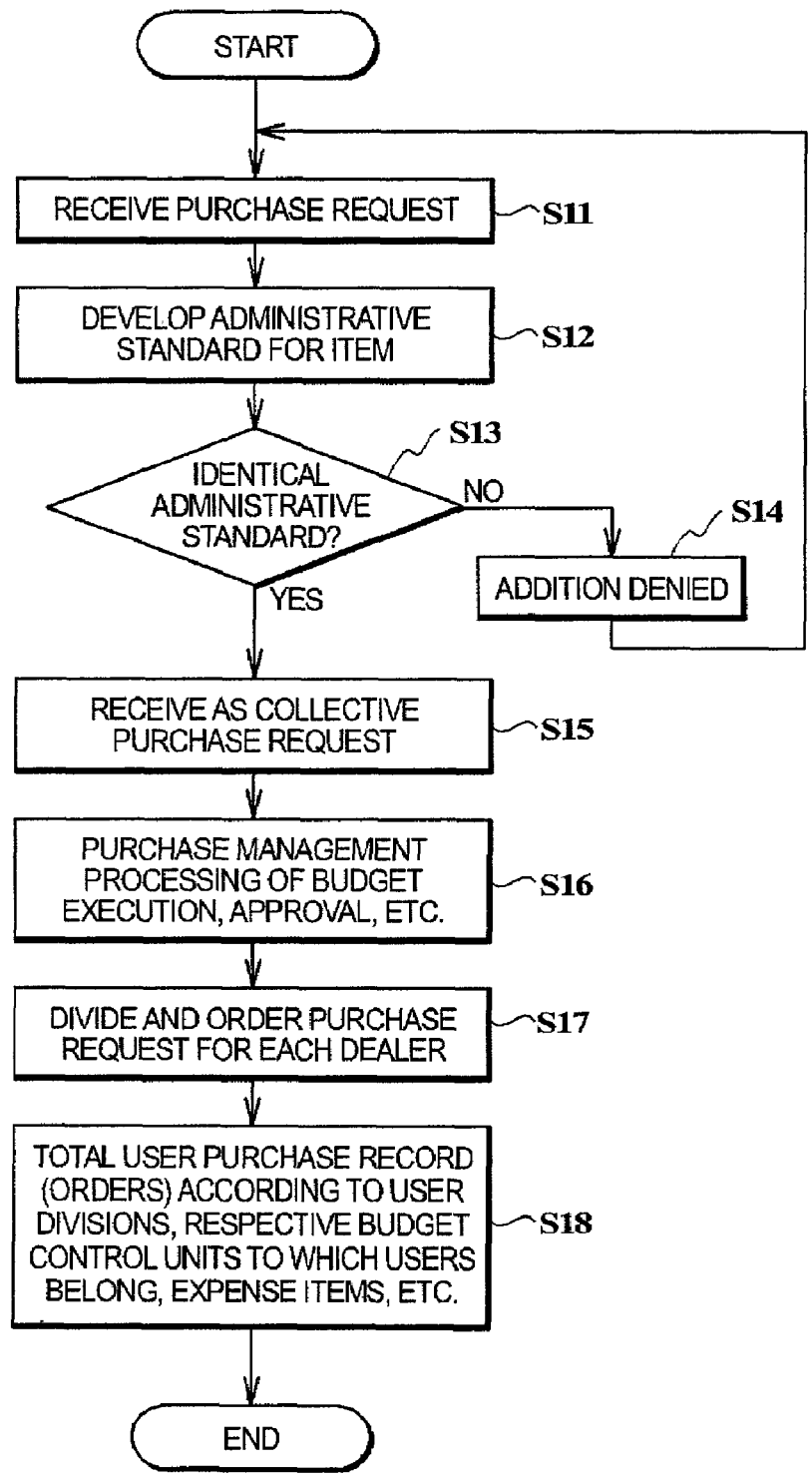
FIG. 8 is a flowchart showing a modified example of the purchase management processing in the present embodiment.

FIG. 8 is a flowchart showing an operational example in this modified example. The server 10 refers to the merchandise master and provides services such as searching items available for purchase request. Added to the searched item information is a usable expense item code. Upon receiving an expense item code together with a purchase request (step S11), the administrative standard of such purchase request is specified (step S12, administrative standard specifying step). For example, the purchase management master 16 shown in FIG. 6 is used to deploy the budget layer/approval path illustrated in FIG. 4(B).

Next, it is determined whether the selected item and the administrative standard (approval path, etc.) are identical (step S13), and, when the administrative standards are the same, a collective purchase request of the plurality of types of items is received (step S15), and administrative control is performed regarding such purchase request (step S16, administrative processing controlling step). Administrative processing conducts predetermined budget control or approval control by referring to the approval/budget control flag or approval method category. Meanwhile, at step S3, when it is ascertained that the administrative standard is different from the administrative standard of the selected item, the user is induced to make a separate purchase request with the addition of such item as an annex. When approval and the like is completed and order is possible, the purchase request is divided per dealer and ordered (step S17), and various totaling is conducted thereafter (step S18).

<Example of First Embodiment: Distribution Supporting System>

Next, disclosed is a distribution supporting system having the purchase management system as a part of its purchase manager. With the distribution supporting system, a plurality of organizations (orderers), a plurality of shops (dealers) and suppliers manufacturing or providing the items are connected. And, orderers do not prepare nor maintain item list information and the like subject to purchase. Upon the ordering organization introducing the system according to the present example, such organization examines, together with dealers such as shops, the list of items subject to purchase (merchandise assortment, or MD) and the expense items thereof. Next, purchase management such as approval path and the like is specified with the expense item and budget control unit as the key. Pursuant to these procedures at the time of introduction, after the commencement of actual operation, the need for the person in charge of the purchase management division to independently suggest expense items and administrative standards to the respective user in the organization will lessen.

In other words, by employing the distribution supporting system according to the present example, it is possible to automatically conduct purchase management within the organization, totaling of purchase records (financial accounting and administrative accounting), automatic selection of orders and automated orders, and delivery to pre-designated divisions and the like. Moreover, since dealers and suppliers are able to receive order information in a fixed format, it is easy for them to optimize the manufacture and distribution. Further, since order information can be stored and identical data may be used for requests from dealers to orderers and inspection (approval) by the ordering organization, it is possible to reduce labor or procedures such as on the confirmation of inspection and invoices. In this example, the ordering organization is referred to as a customer.

Figure 9:
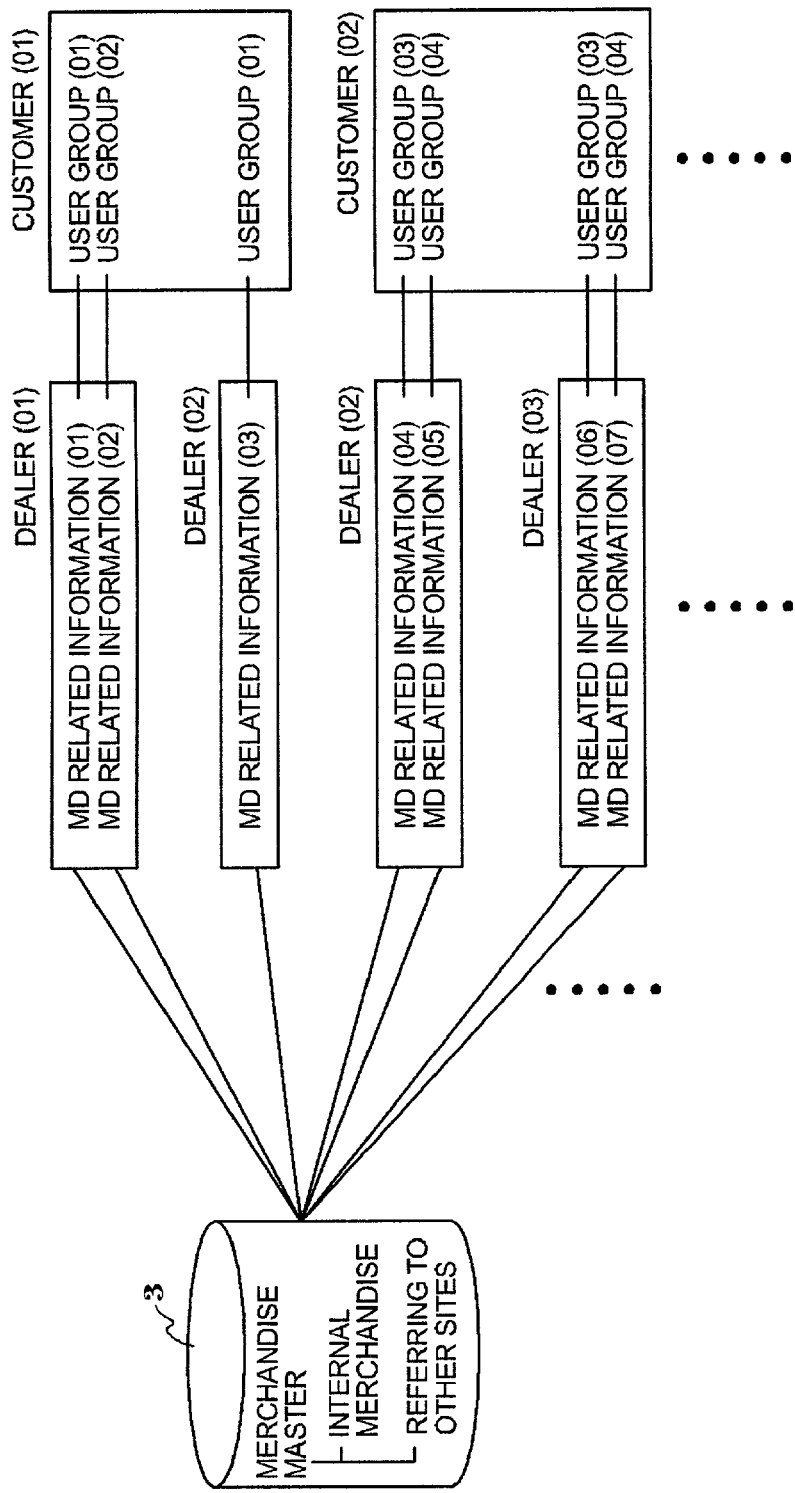
FIG. 9 is an explanatory diagram for explaining the outline of the example of the first embodiment.

FIG. 9 is an explanatory diagram showing the relationship between the MD related information used in this example and the user. As shown in FIG. 9, the customer's user group (management unit or purchase unit) and the dealer are connected with the MD related information. MD related information is information for specifying a list of items purchasable by the user per user group. The expense item code per item is defined in this MD related information. Moreover, by preparing MD related information per dealer, an exclusive dealer may be specified by specifying such MD related information. Introduction images of items may also be stored, in addition to being stored in the MD related information, in the internal merchandise master of the distribution support system or merchandise master of other sites connected via a network.

Items contained in the merchandise assortment as MD related information are items registered in merchandise master 3. The registration and renewal of information on the respective items are only conducted once with the merchandise master by employing the merchandise master, user group and MD related information registered by dealer. In the example shown in FIG. 9, dealer (01) has two MD related information (01, 02) for separate user groups. Dealer (02) has one MD related information (03) for customer (01).

User group (01) of customer (01) is able to make a purchase with the distribution supporting system regarding items merchandise-assorted with MD related information (01) of dealer (01), and items assorted with MD related information (03) of dealer (02). It is preferable that MD relate information be defined such that the same item does not overlap in the two MD relation information (01, 03) against the same user group (01). When items do not exist in layers in a plurality of merchandise assortments against the same user, when a user specifies an item, the dealer handling such item can be specified as the exclusive dealer. When this user group (customer purchase unit) and the item are specified, dealers and commerce channels per item may be separated by making the structure such that the dealer is automatically selected. For example, if a user belonging to the customer's purchase unit logs into the distribution supporting system according to the present example and specifies a desired item for purchase, since the MD related information is registered such that the same item does not overlap among dealers for the same user, the MD related information maybe specified exclusively with such user and item. Therefore, when the user and item are determined, a dealer may be specified exclusively. As a result, the user merely has to specify the item, and is not required to select the dealer. Then, the user is able to place orders to a dealer predetermined by the purchase management division of such customer without having to know beforehand the dealer name or relationship between such dealer and item.

When a user directly orders an item, a required amount of order is possible as necessary, and the amount of stock in the purchase division or the like can be reduced. And, in addition to the cost reduction pursuant to the reduced purchase unit price and inventory, it is also possible to reduce direct and indirect personnel expenses necessary for purchase management. For example, when the total purchase amount of office supplies in a year for a certain organization is "100", the personnel expenses for employees to administer such "100" may be "300". However, office supplies are inevitably necessary for business operation and arrangements must be made therefor, and, since tax-related reports and accounting processing are also requisite procedures, the cost reduction of this "300" (invisible cost) was not easy.

However, by placing orders of separate items with the MD related information, procedures of the purchase management division is to set forth the merchandise assortment (handled items) per dealer once every several years, and the user is able to directly place the actual orders. Moreover, this order is executed with the dealer and at the offered price set forth by the purchase management division. That is, by the user merely specifying the item, the customer as the user may directly implement purchase activities in accordance with the purchase conditions set forth by the purchase management division. Particularly in this example, the expense item selectable at the time of making the purchase request, which is the premise of ordering, is provided to the user, and purchase management is conducted by using this expense item with the purchase administrative standard as a unit. Therefore, the user is able to place orders for necessary items when necessary, without having to know the expense item in the respective items, the approval path which differs per item, or the shop of the item. While enabling such simplified orders by the user, the cumulative amount of the budget limit/purchase record in budget control units at a plurality of steps may be administered concisely. Thus, the optimization of purchase activities and optimization of expense distribution are facilitated.

In transactions employing this system, a plurality of dealers executed a periodical purchase contract, one year for example, with the purchase management division of the customer, and such dealers carefully consider the merchandise assortment and price, and become competitive. Until the time the contract between the purchase management division of the customer and the dealer is terminated, in a certain example, there shall be one dealer for one item. Thus, users such as the employees of the customer can place orders merely by determining the item without knowing the dealer or purchase conditions. When integrally considering the merchandise assortment for separate dealers set forth independently in accordance with the merchandising of a plurality of dealers, this merchandise assortment may be considered to be an electronic catalog in which the customer specified the item and dealer.

Figure 10:
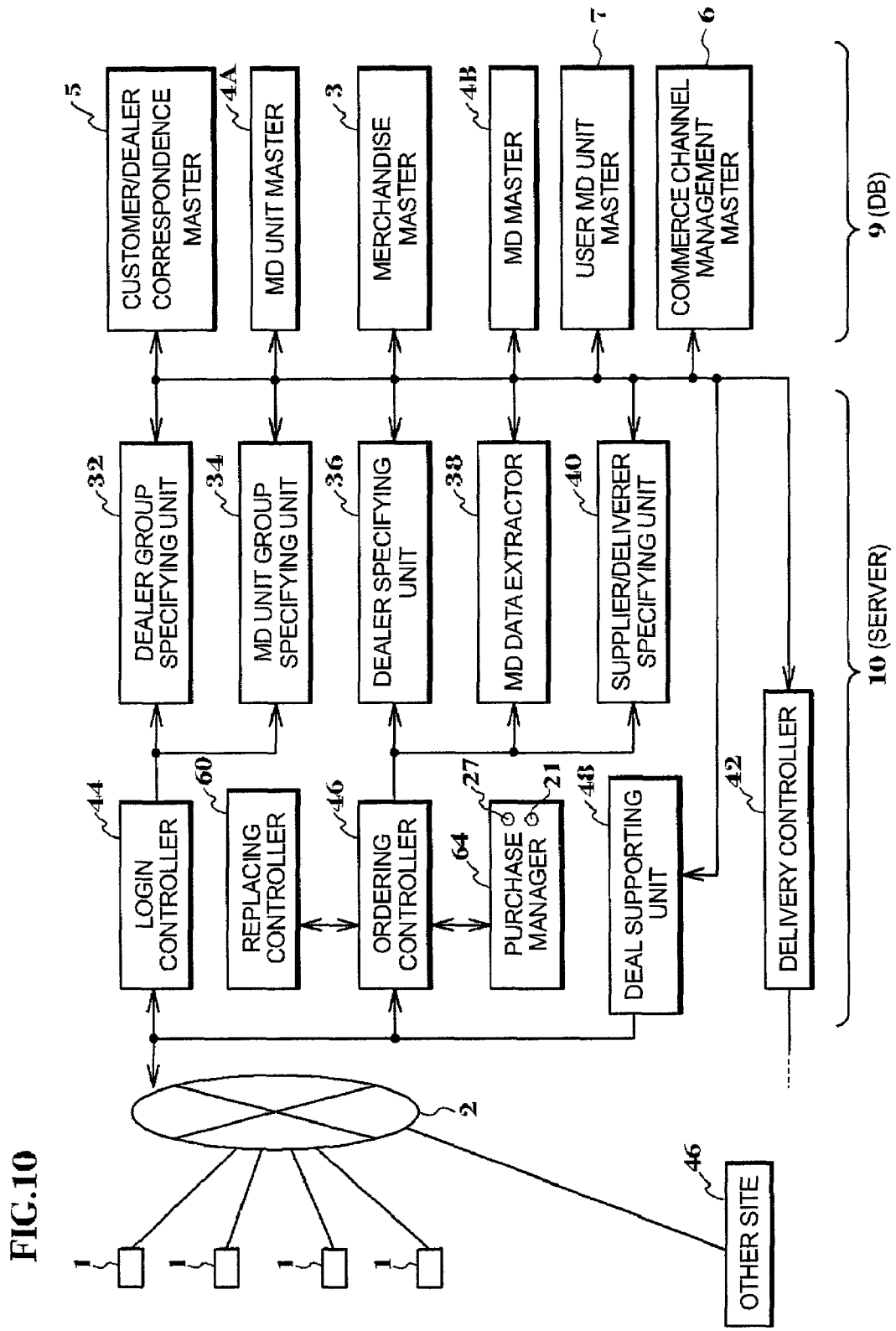
FIG. 10 is a block diagram showing a structural example of the distribution support system according to the present embodiment.

The function of this system for realizing the order administration employing MD related information, which is such customer specific electronic catalog, is referred to as item specific ordering controller 22B. In the constitution shown in FIG. 1, the divided ordering controller 22 comprises an item specific ordering controller 22B for transmitting ordering data per dealer predetermined for each item. FIG. 10 is a block diagram showing a detailed structural example of this example. The example shown in FIG. 10 comprises a database 9 storing the respective masters, and a server 10, which connected to a prescribed terminal 1 via a network 2, for controlling the data transmission/reception with such terminal 1, and extracting or registering data of the respective masters in accordance with the request. Although the database comprises various masters necessary for distribution support, in this example, the database comprises the following masters shown in FIG. 11 for placing and receiving orders. Pursuant to the following master constitution, N number of customers, N number of dealers, N number of suppliers and middle distributors such as wholesalers are connected.

(1) Customer/dealer correspondence master 5 to which are defined a plurality of dealers classified by items to the purchase unit of customers regarding the relationship between prescribed purchase units of customers and the dealer providing items such as goods and services to the user belonging to such purchase.

(2) MD unit master 4A, wherein a purchase unit, which is one of the operation units of the user or customer, and the dealer are defined as the key, and to which is defined an MD unit for identifying merchandise assortments of items to be provided from the dealer to such purchase unit.

(3) MD master 4B to which merchandise assortment data is defined as attribute information relating to item distribution, such as the item and supplier and deliverer belonging to the merchandise assortment identified by the MD unit of this MD unit master. The merchandise assortment master 4B stores the expense item code selectable per item.

(4) Merchandise master 3 to which is defined attribute information of the item itself, such as the specification and supplier of such item for each item number of items.

(5) Commerce channel management master 6 to which is defined a middle distributor such as a wholesaler according to the relationship among the dealer and supplier and deliverer.

Database 9 further comprises the various masters shown in FIG. 12 for performing purchase management. The various masters shown in FIG. 12 are an example of the detailed constitution of the various masters shown in FIG. 6.

(6) Expense item master 54 for administering the list of expense items selectable per management unit. By employing an order-time selectivity flag, it is possible to perform processing of compulsorily assigning a specific expense item in relation to a certain item.

(7) Budget control unit master 56 for administering the list of budget control units (division code, project code, etc. on purchase management) provided in a plurality per management unit. The budget control master stores approver user ID for the respective budget control units and the expense item code used in such budget control unit.

(8) Approval path and budget layer master 55 for administering the approval path and budget layer specified by the budget control unit ID of the ordering division and the expense item code of the selected expense item for each management unit. This is approximate to the purchase management master shown in FIG. 6.

(9) Budget limit/approval accumulation master 57 for administering the budget for each budget control unit and the accumulated amount of purchase. The accumulated amount for approval is compared with the budget, and, when adopting the accumulative method, approval will be required when the accumulative amount for approval exceeds the budget.

In the examples shown in FIG. 10 through FIG. 12, "MD related information" is administered with two masters; namely, MD unit master 4A and merchandise assortment master 4B. Here, the identification of merchandise by the dealer on user groups is conducted with the "MD unit". The actual merchandise assortment itself is not registered in the MD unit information registered in MD unit master 4A. In this example, merchandise assortment is defined by combining the MD unit ID and item number. The combination of this MD unit ID and item number will be referred to as merchandise assortment in this example. This merchandise assortment is registered in merchandise assortment master 4B.

The server 10 comprises the following constitution in the present example.

A dealer group specifying unit 32 for specifying a dealer group per management unit of the customer by referring to the customers/dealer correspondence master.

An MD unit group specifying unit 34 for specifying an MD unit per user or per management unit of the customer by referring to the MD unit master.

A dealer specifying unit 36 for specifying an exclusive dealer among the dealer group dealing with the user based on the merchandise assortment data per plurality of MD units specified by the MD unit specifying unit 34, the item number selected by the user for ordering.

An MD data extractor 38 for extracting, among the respective merchandise assortment data of the MD unit group specified by the MD unit group specifying unit per item number based on such item number input by the user for ordering, exclusive assortment data in which exclusive assortment data per item number is defined per MD unit from the merchandise assortment master.

Supplier/deliverer specifying unit 40 for specifying the supplier and deliverer of the item based on merchandise assortment data extracted by the merchandise assortment data extractor.

A deal supporting unit 48 for specifying the commerce channel from the supplier to the dealer by referring to the commerce channel management system in accordance with the combination of the supplier and deliverer and dealer, as well as supporting the purchase/sales processing in such commerce channel.

A delivery controller 42 for controlling the delivery of the item from the deliverer to the user under the dealer's name.

Pursuant to the constitution shown in FIG. 10, even when a plurality of dealers (MD units) are defined in user groups, the commerce channel from the supplier to the customer is automatically decided at the stage of the user selecting the item number for ordering.

Here, the distribution of items is divided into commerce channel and physical logistics. In other words, although the dealer may conduct sale by transferring the ownership right in the item to the customer, the actual item is directly delivered to the user of the customer from the supplier or deliverer. As described above, without having to accompany physical distribution, it is possible to transfer (commerce channel) the ownership right in the item from the supplier to the user via a middle distributor or dealer. By executing a periodical purchase contract with the customer, dealers may conduct sale without having to store stock during such term and without having to conduct delivery. Meanwhile, by employing a deliverer, it is possible to realize further effective physical logistics to a plurality of customers, and to perform favorable inventory administration by making the supplier the subject of storing stock.

With the system of this invention, since price negotiation is not conducted for each order between the customer and dealer (since an agreement is reached beforehand for a fixed term), it is also possible to set the price in the distribution channel beforehand. Moreover, since a supplier is determined when the item is determined, it is possible to automatically specify the deliver per item. Accordingly, the present invention in this embodiment, as the distribution supporting system, specifies the predetermined commerce channel upon receiving an order from the user of the customer, and performs control so that the deliverer separately delivers such item to the user of the customer.

In the example shown in FIG. 10, the server 10 comprises a login controller 44 for requesting the input of a user ID for identifying a user, password, and a customers management unit ID to which the user belongs, when such user accesses the server. The user is able to log into the server 10 of the distribution supporting system by reading the login page of the distribution supporting system according to the present example and inputting the user ID and customer management unit ID. It is possible to identify the customer management unit to which the login user belongs, and his/her user ID. In this example, the dealer group specifying unit 32 comprises a function for specifying the dealer group capable of providing items to the login user based on customer management unit ID input according to the control of the login controller 44.

Specified in the customer/dealer correspondence master 5 is on or a plurality of contract dealers (dealer groups) providing items to users belonging to the customer management unit ID and the customer management unit identified by such customer management unit ID. Although it is possible to specify the dealer group by employing the MD related information, in the example shown in FIG. 10, by specifying the dealer group in the login state, it becomes possible to display messages from the respective dealers to such login users, or to determine the existence of dealers that suspended business urgently at the time of login. Further, it is possible for a user belonging to the customer purchase unit to make various inquiries to transacting dealers prior to the selection of items.

Moreover, the MD unit group specifying unit 34 comprises a function of specifying an MD unit group to which is defined a list of items provided to the user per dealer based on the user ID or customer management unit ID input in accordance with the control of the login controller 44. Defined in the user/MD unit master 7 is the relationship between a user ID and MD unit ID. The MD unit group specifying unit 34 specifies the MD unit ID group relating to the login user by referring to the user/MD unit master 7. When this MD unit ID group is distinguished, the login user is able to access all orderable items.

Upon referring to FIG. 10, the server 10 comprises an ordering controller 46 for controlling the temporary storage of items numbers of one or a plurality of items ordered by the user as an order item number group. And, the dealer specifying unit 36 comprises a function of determining an exclusive dealer among the dealer group based on the MD unit of the item number specified per item number of the order item number group stored in the ordering controller 46. The maintenance responsible management unit ID in the MD unit master is the management unit ID of the dealer providing the merchandise assortment. The dealer specifying function, in the present example, automatically specifies at the time of ordering the dealer providing items to the user by referring to the maintenance responsibility management unit ID of the MD unit master after the MD unit is specified by the user ID and item number. Here, the dealer specifying unit 36 is capable of specifying such dealer without having to refer to information concerning the dealer group specified by the dealer group specifying unit. Meanwhile, the dealer specified by this dealer specifying unit 36 is one among the dealer group specified by the dealer group specifying unit.

When the item number is determined in a state where the user ID is determined, the MD unit ID can be specified exclusively under the premise that the merchandise assortment is not overlapping. As the merchandise assortment is defined per dealer, an exclusive dealer can be specified from a plurality of dealers by combining the user ID and item number.

Connected to the ordering controller is a purchase manager 64 which functions as the purchase management system in the aforementioned embodiment. The purchase manager 64 comprises a function of denying, in a case where the administrative standard is determined and when a temporarily stored order item number or order item number group exists, the addition of a new item and inducing a collective order under the same approval standard when the administrative standard of the order item number and the item number of the item to be newly added.

In the example shown in FIG. 10, the purchase manager 64 comprises a function (administration controller 21 in the example shown in FIG. 1) for controlling the reception of a confirmed order to an order item number group from a user or other users such as the approver. When an approver approves the order, it may be judged that a confirmed order was made to the order item number group. When a confirmed order is made, the supplier/deliverer specifying unit comprises a function of specifying the supplier and deliverer of such item number by referring to the merchandise assortment data identified by the MD unit against the dealer specified by the dealer specifying unit 36 per item number of the order item number group of the confirmed order. In other words, in this example, an exclusive supplier and deliverer are specified by combining the dealer and item. Even in cases where a plurality of suppliers such as flower gift services and business card printing services exist, a supplier is specified per user and item at the time of generating the MD related information.

Moreover, the deal supporting unit 48 comprises a function of specifying the middle distributor of the commerce channel, from the supplier to the dealer, as the exclusive distribution path by referring to the commerce channel management master 6 in accordance with the combination of the supplier and deliverer specified by the supplier/deliverer specifying unit 40 and the dealer of such item number. That is, in this example, when the combination of the dealer and supplier and deliverer is determined, the commerce channel from the dealer to the supplier is specified exclusively. In this commerce channel, the dealer specifies a vendor exclusively per item or item group. This vendor further specifies its vendor exclusively. Until the connection of this middle distributor reaches the supplier, such path is exclusive.

By making the deliverer a key of specifying the commerce channel, the merchandise assortment between customers and dealers can be more abundant and flexible. For instance, upon setting a separate item number for ordinary purchases and emergency purchases of copying paper, a deliverer affiliated with the supplier can deliver the copying paper in an ordinary purchase, and, contrarily, the dealer can directly deliver the copying paper to the user in an emergency purchase. Here, the deliverer of the copying paper in emergency situations is the dealer itself. Thus, a commerce channel does not arise. In order to enable various definitions of modes of such deliverer as well as to realize fast and certain automated judgment of the commerce channel during normal operation, the commerce channel is determined in accordance with the combination of the dealer and supplier and deliverer. Further, without limiting the direct delivery from the supplier and by realizing a scheme approximate to the existing commerce channel on the system, items of a wide variety of business lines can be transacted with the distribution supporting system according to the present example. When the types of items increase, the user is able to place orders even more easily with the collective ordering function within the purchase administrative standard, and the scope of automation of accounting processing according to the present example will expand.

In the example shown in FIG. 10, the server 10 comprises a replacing controller 60 for notifying, when a replacement item number is stored in an item by referring to MD related information upon receiving an order request for ordering such item from a terminal used by a user belonging to a purchase unit, the item of such replacement item number to the user for order entry. The replacing controller may also comprise a discontinued item order changing function for inducing the user to change or cancel the order of an item when the item number of the received order was discontinued upon referring to the MD related information. By automatically implementing item number replacement or the like based on the replacement automatic implementation level stored beforehand in the MD related information when an item number is discontinued (stoppage of item delivery) when replaced with a new product, the burden on the purchase management division of the customer is lightened, and inconveniences of not being able to obtain a necessary item due to discontinuance can be avoided.

Further, the purchase management unit 64 may comprise an administrative standard specific purchase request data storage unit 27 for storing, for use in a subsequent purchase request onward, a combination of items to which a purchase request was made belonging to one administrative standard by the administration controller 21. Similar to the bookmark function and favorites registration function for perusing homepages, a list of items ordered is periodically registered in order simplify subsequent orders. However, since the purchase of non-productions is of a wide variety and in small quantities, the method of organization is difficult, and reorders based on referral to a simple purchase archive may require more time for the search. The administrative standard specific purchase request data storage unit 27 seeks to shorten the operational time required for the reorder by lumping together the purchase requests and storing the combinations thereof which can be filed.

Figure 13:
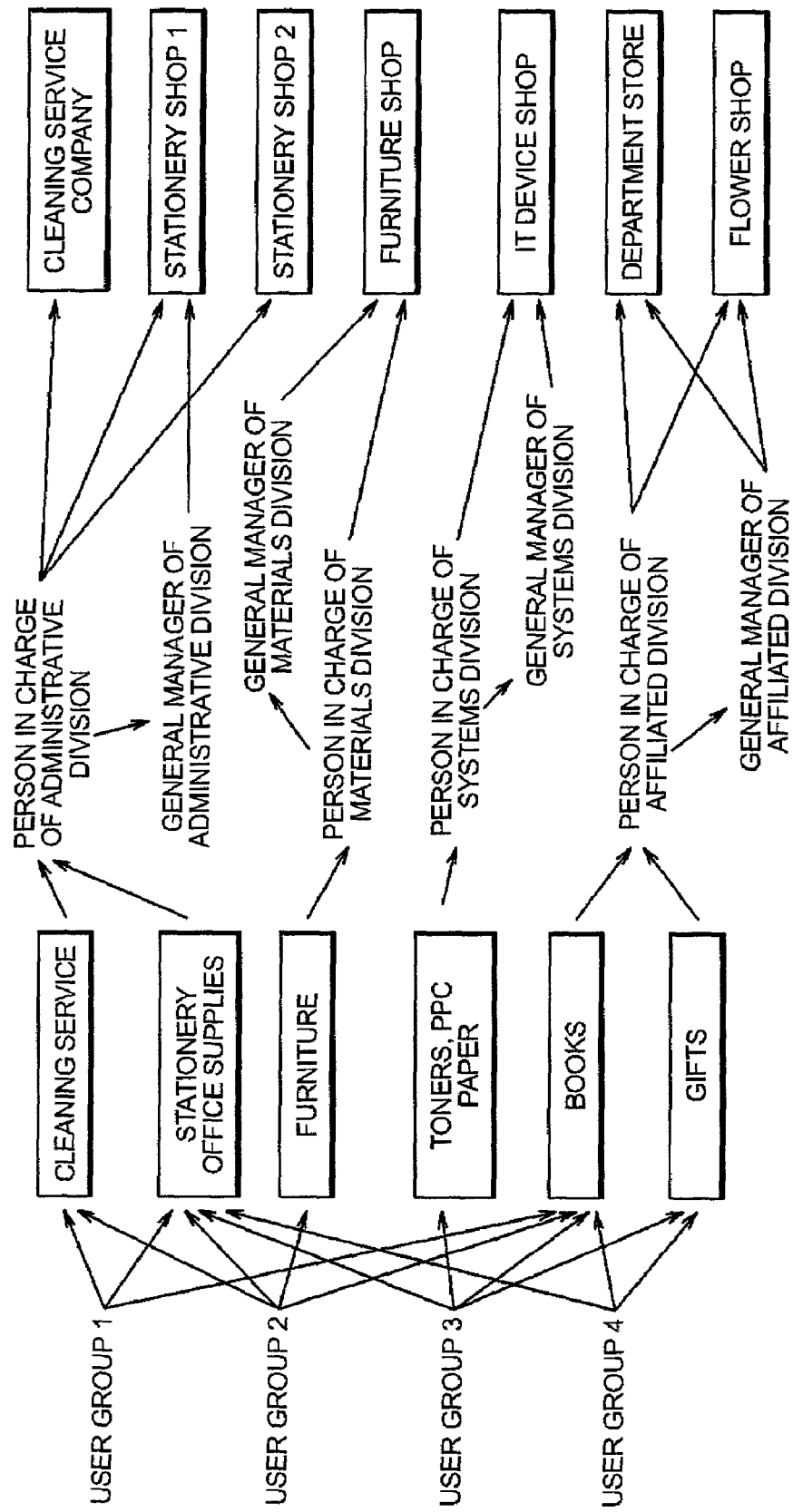
FIG. 13 is an explanatory diagram for explaining the advantages of the present example.

FIG. 13 is an explanatory diagram for explaining the effects of employing the distribution support system according to the present example. As shown in FIG. 13, by employing the MD related information, it is possible to specify in advance the purchasable item group peruser. For example, with respect to furniture, only user group 2 is allowed to make a purchase. When a purchase request for a necessary item is made when necessary, the approval path and budget control unit according to the expense item of the item are specified. For instance, approval of the person in charge of the administrative division is required for stationery office supplies, and when in excess of ¥200,000, the approval of the administrative division general manager is also required. The approval path and budget layer master shown in FIG. 12 administer these purchase administrative standards. By employing the MD related information, it is possible to automatically specify the dealer per item. Thus, the user group is able to place orders without having to be conscious of the approval path or budget limit, and without having to know to which dealer the order should be placed in relation to the periodical purchase contract or the like. Further, in this example, a collective purchase request (order) may be made per purchase administrative standard. In the example shown in FIG. 13, since books, and gifts such as flowers and year-end gifts are within the budget limit of the person in charge of the administrative division, the purchase request for books and flowers may be made collectively. Here, books are ordered to a department store and flowers to a flower shop.

<Second Embodiment: Purchase Management Supporting System>

Next, disclosed is a purchase management supporting system for providing product data and the like to the purchase management system on the customer side. Since non-productions are of a wide variety and in small amounts, improvement and discontinuance thereof are also frequent, and it is complicated for the ordering side to create a purchase management system and to administer the merchandise master thereof. This may have the opposite effect and increase the cost. Meanwhile, with organization what have a completed workflow system for approval and the like, it will be difficult to reduce maintenance costs and the like of product data by introducing the aforementioned distribution supporting system and the like. Thus, the purchase management supporting system according to the present embodiment performs the maintenance of product data on the purchase management supporting system side and provides the latest product data to the customer's purchase system. Here, in this embodiment, item data is transmitted in a state where the expense item code and administrative standard code and the like necessary for purchase management are added.

Figure 14:
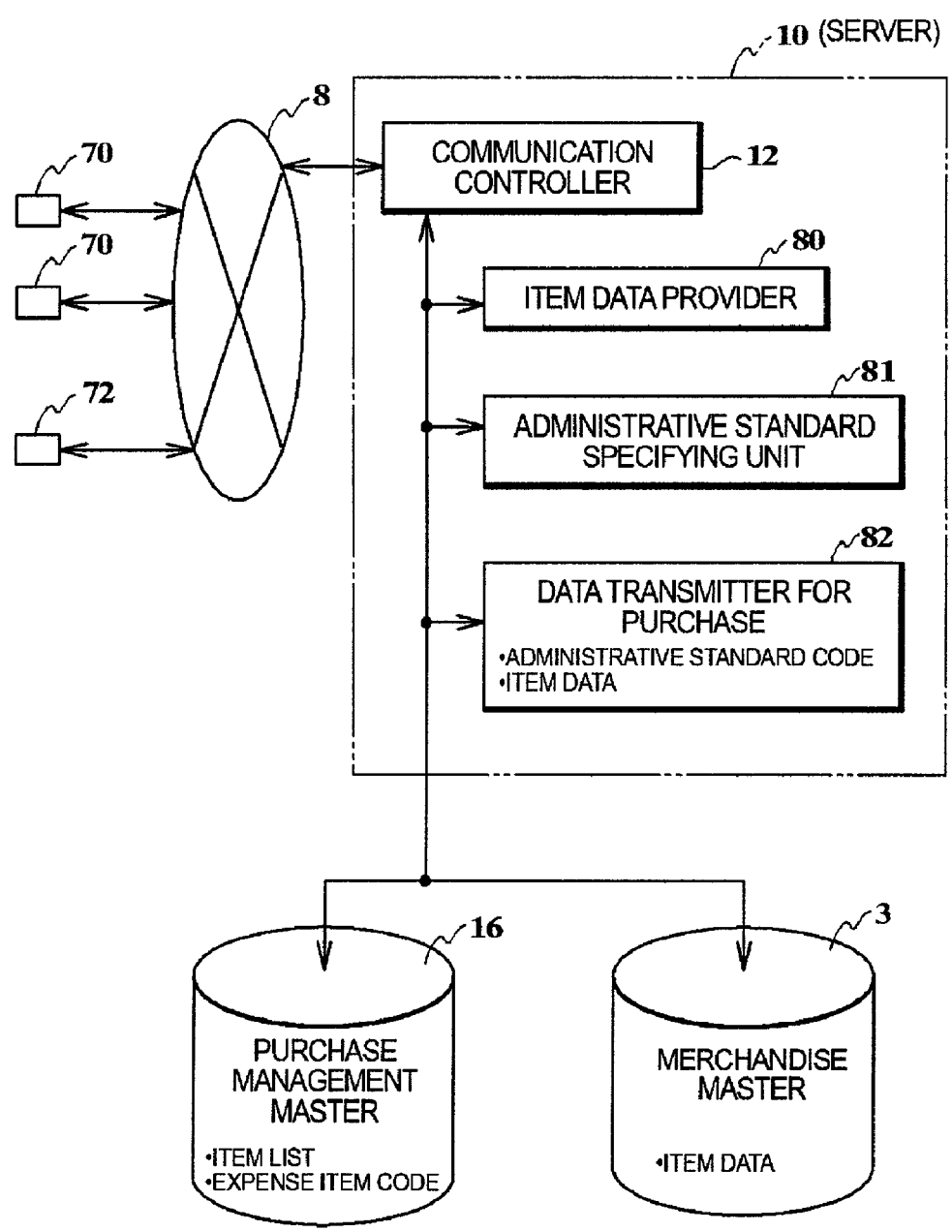
FIG. 14 is a block diagram showing the structural example of the second embodiment of the present invention.

FIG. 14 is a block showing a structural example of the purchase management supporting system in this embodiment. The example shown in FIG. 14 comprises a server 10 connected to one or a plurality of purchase management systems 70, a purchase management master 16 storing users and purchase management units per management unit operated by the purchase management system, and a merchandise master 3 storing item data relating to items which are the products and services. And, the purchase management master 16 stores a list of items to be ordered by the management unit per management unit of the respective purchase management systems, an expense item code defined per item or item group, and an expense item code defined per purchase management unit.

Further, the server 10 comprises an item data provider 80 for providing, upon referring to the purchase management master and merchandise master in accordance with the operation of the user when access is made from a terminal of such user belonging to the purchase management unit in the management unit of the respective purchase management systems, item data to the terminal of such user; an AS specifying unit 81 for specifying the administrative standard of the purchase request in the management unit based on the expense item code defined in the item per each time such item is selected by the user among the product data provided by the item data provider 80; and a purchase data transmitter 82 for transmitting, together with the item data selected by the user, an administrative standard code for identifying the administrative standard specified by the AS specifying unit, to the purchase management system.

The item data provider 30 provides search functions or the like of items when access is made by the user logged into the purchase management system of the customer, and provides information relating to the item necessary for the user. Here, when the purchase price and multiplication ratio of the suggested retail price are defined, it would be preferable to additionally provide the price to the user terminal. Further, when purchasable items are not limited per user group in the purchase management system of the customer, it would be preferable that MD related information according to the aforementioned example be prepared.

The AS specifying unit 81 specifies the administrative standard of the purchase request in the management unit based on the expense item code defined in an item each time a user of the customer's purchase management system makes a selection. The purchase data transmitter 82 transmits, together with the item data selected by the user, an administrative standard code for identifying the administrative standard specified by the AS specifying unit 81, to the purchase management system. The administrative standard code, for example, is a budget limit code for identifying the budget control unit to which the user belongs and the expense item of the item selected by such user. Further, this may also be an approval path code for identifying the approval path in the management unit to which the user belongs. The purchase management system of the customers controls the approval and the like in the purchase management system by referring to the administrative standard code of this budget limit code and the like.

The purchase management supporting system may also comprise an order acceptance function, or the distribution supporting function disclosed as an example above. Here, the scheduled item group of the purchase request in which the administrative standard is specified by the AS specifying unit 81 may be temporarily retained, and such item group may be provided as the contents of the shopping cart, for example, when the same user makes another access, or, when ordering is permitted in the purchase management system on the customer side, the item group temporarily retained by the reception of orderable signals can be accepted and handled.

Further, the purchase management master may also store the expense item code per price determination method defined in the respective items of the merchandise master of other sites 72 administered by other servers connected via the merchandise master or network, and determine the price determination method on expense items to which items are to be added from other sites 72. With respect to items stored in the merchandise master of other sites, it is difficult to incorporate such items beforehand in the MD related information. Meanwhile, as prices need to be determined in one form or another, various price determination methods must be arranged. Since this price determination method is determined in accordance with the type of item, if an expense item is defined per such price determination method, one or a plurality of selectable expense item codes may be specified even when obtaining item data in alliance with other sites.

What is claimed is:

1. A system for purchase management based on an administrative standard of purchasing, said system comprising:
    an administrative standard specifying unit for specifying, when a purchase request is to be made on a plurality of types of items, the administrative standard of the purchase request according to the expense items representing the category or use of said items defined for each item, by defining useable expense item codes based upon a correlation between a budget control unit for a user and said expense items;
    an administrative standard specific dividing controller for performing control of dividing said purchase request per administrative standard when said administrative standard specifying unit specifies that the administrative standards of the respective items to which the purchase request was made differ;
    an administration controller for receiving the purchase request divided per administrative standard and administratively controlling said purchase request;
    a divided ordering controller for performing control of dividing and ordering said purchase request per item specific dealer when said administration controller allows the purchase request;
    an order totaling controller for totaling the order data ordered by the divided ordering controller according to the attribute of the expense item of said order;
    a budget control unit master storing a customer's management unit identification, a budget control unit identification and an expense item code usable with a budget control unit showing the budget control unit identification, the customer's management unit identification, a budget control unit identification and the expense item code being made in connection with each other; and
    a merchandise assortment master storing an item number showing an item, the expense item code showing an expense item showing one or more category or use of usable with the item and a merchandise unit identification showing a merchandise assortment to a user of a customer front, the item number, the expense item code and merchandise unit identification being made in connection with each other, wherein the administrative standard specifying unit has a function specifying the expense item made in connection with the item number by reference to the merchandise assortment master based on the item number assigned to the item when purchase request of a plural kinds of items is made, or specifying the expense item made in connection with the budget management unit identification by reference to the budget management unit master based on the budget management unit identification showing the budget management unit to which a user belongs, and accumulating them in a shopping cart, a function specifying the administrative standard of each item to which the purchase request is made by reference to an approval path and a budget layer master based on the expense item code and the budget management unit identification, and a function determining whether or not an administrative standard of an item newly accumulated in the shopping cart agrees with an administrative standard of the item already accumulated in the shopping cart whenever an item is accumulated into the shopping cart.

2. The system according to claim 1, further comprising:
    a useable expense item code displaying controller for selectively displaying, at the time of said purchase request the useable expense item codes, and the expense item code set forth per category of said items or per price decision method of said items; and
    a useable expense item specifying unit for inputting, among one or a plurality of useable expense item codes displayed selectively, the useable expense item code specified when the user makes the purchase request as the useable expense item of said item as said administrative standard specifying unit.

3. The system according to claim 1, wherein said administrative standard specifying unit comprises a user specific administrative standard specifying function that specifies said administrative standard according to the budget control unit to which said user belongs and said expense item.

4. The system according to claim 1, wherein said administrative standard specifying unit comprises a path specifying function that specifies as said administrative standard the budget control unit identification for identifying one or a plurality of budget controlling divisions, or the budget control unit identification for identifying a plurality of budget/approval controlling divisions.

5. The system according to claim 1, wherein said divided ordering controller comprises an item specific ordering controller for transmitting said order data per said item specific predetermined dealer.

6. The system according to claim 1, wherein said user specifies a purchasable item group per user making the purchase request of items, and further comprising an item accessing controller for controlling the display of items per respective user in accordance with said purchase availability.

7. The system according to claim 6, wherein said item accessing controller comprises a fUnction of determining the purchase availability per said user based on merchandise assortment related information for specifying the merchandise assortment set forth per said respective user or user group.

8. The system according to claim 7, wherein said item accessing controller comprises a function of determining the purchase availability per said user based on the predetermined purchasable expense item per said respective user or user group.

9. A system for purchase management based on an administrative standard of purchasing, said system comprising:

an administrative standard specifier that specifies administrative standards for a purchase request regarding a plurality of types of items by defining useable expense item codes that correlate between a budget controller for a user and expense items;

an administrative standard specification divider that divides the purchase request based upon said administrative standards when said administrative standard specifier specifies different administrative standards for the purchase request;

an administration controller that receives the divided purchase request and that controls the administration of the divided purchase request;

an order divider that divides and orders said purchase request based upon specified dealers when the administration controller allows the purchase request;

an order totaler that totals the order from the order divider according to expense items in said order;

a budget control unit master that stores a customer's management unit identification, a budget control unit identification and an expense item code usable with a budget control unit showing the budget control unit identification, the customer's management unit identification, a budget control unit identification and the expense item code being made in connection with each other; and a merchandise assortment master that stores an item number showing an item, the expense item code showing an expense item showing one or more category or use of usable with the item and a merchandise unit identification showing a merchandise assortment to a user of a customer front the item number, the expense item code and merchandise unit identification being made in connection with each other, wherein the administrative standard specifying unit has a function specifying the expense item made in connection with the item number by reference to the merchandise assortment master based on the item number assigned to the item when purchase request of a plural kinds of items is made, or specifying the expense item made in connection with the budget management unit identification by reference to the budget management unit master based on the budget management unit identification showing the budget management unit to which a user belongs, and accumulating them in a shopping cart, a function specifying the administrative standard of each item to which the purchase request is made by reference to an approval path and a budget layer master based on the expense item code and the budget management unit identification, and a function determining whether or not an administrative standard of an item newly accumulated in the shopping cart agrees with an administrative standard of the item already accumulated in the shopping cart whenever an item is accumulated into the shopping cart.

\* \* \* \* \*